United States Patent
Di Censo et al.

(10) Patent No.: US 10,053,036 B2
(45) Date of Patent: Aug. 21, 2018

(54) SHAPE-CHANGING SURFACE

(71) Applicant: HARMAN INTERNATIONAL INDUSTRIES, INC., Stamford, CT (US)

(72) Inventors: Davide Di Censo, Oakland, CA (US); Stefan Marti, Oakland, CA (US); Jaime Elliot Nahman, Oakland, CA (US); Mirjana Spasojevic, Palo Alto, CA (US)

(73) Assignee: HARMAN INTERNATIONAL INDUSTRIES, INCORPORATED, Stamford, CT (US)

(*) Notice: Subject to any disclaimer, the term of this patent is extended or adjusted under 35 U.S.C. 154(b) by 46 days.

(21) Appl. No.: 14/815,766

(22) Filed: Jul. 31, 2015

(65) Prior Publication Data

US 2016/0185309 A1    Jun. 30, 2016

Related U.S. Application Data

(60) Provisional application No. 62/098,958, filed on Dec. 31, 2014.

(51) Int. Cl.
| | |
|---|---|
| *B60R 16/00* | (2006.01) |
| *B60R 16/037* | (2006.01) |
| *B60K 35/00* | (2006.01) |
| *B60K 37/02* | (2006.01) |
| *G06F 3/01* | (2006.01) |

(52) U.S. Cl.
CPC ............ *B60R 16/037* (2013.01); *B60K 35/00* (2013.01); *B60K 37/02* (2013.01); *B60R 16/005* (2013.01); *G06F 3/016* (2013.01)

(58) Field of Classification Search
CPC ..... B60R 16/037; B60R 16/005; B60K 37/02; B60K 35/00; G06F 3/016
See application file for complete search history.

(56) References Cited

U.S. PATENT DOCUMENTS

| | | | |
|---|---|---|---|
| 8,400,410 B2 | 3/2013 | Taylor et al. | |
| 8,717,151 B2 | 5/2014 | Forutanpour et al. | |
| 2007/0236450 A1* | 10/2007 | Colgate | G06F 3/016 345/156 |
| 2007/0247420 A1 | 10/2007 | Strohband et al. | |
| 2011/0304550 A1 | 12/2011 | Romera et al. | |
| 2012/0235935 A1 | 9/2012 | Ciesla et al. | |
| 2016/0124510 A1* | 5/2016 | Hyde | G06F 3/016 340/407.2 |

OTHER PUBLICATIONS

Wikipedia Article, Actuator, printed Nov. 2016.*

(Continued)

*Primary Examiner* — Alan D Hutchinson
(74) *Attorney, Agent, or Firm* — Artegis Law Group, LLP

(57) ABSTRACT

A system for changing the shape of a vehicle component includes one or more actuators coupled to the vehicle component and a processor coupled to the one or more actuators. The processor is configured to determine that a software application has switched from a first mode to a second mode and cause the one or more actuators to transition a surface of the vehicle component from a first shape associated with the first mode to a second shape associated with the second mode.

20 Claims, 23 Drawing Sheets

(56) References Cited

OTHER PUBLICATIONS

Stanley et al, Controllable Surface Haptics via Particle Jamming and Pneumatics, IEEE Transactions, 2014.*
Extended European Search Report Application No. 15201953, dated May 3, 2016, 7 pages.
Follmer, et al. "Jamming User Interfaces: Programmable Particle Stiffness and Sensing for Malleable and Shape-Changing Devices" UIST'12, Oct. 7-10, 2012, Cambridge, Massachusetts, USA. Copyright 2012 ACM978-1-4503-1580-7/12/10. (http://tmg-trackr.media.mit.edu:8020/SuperContainer/RawData/Papers/484-Jamming%20User%20Interfaces%20Programmable/Published/PDF).
Tactus Technology White Paper "Taking Touch Screen Interfaces Into a New Dimension" Copyright © 2012 Tactus Technology, Inc. (http://tactustechnology.com/wp-content/uploads/2013/09/Tactus_Technology_White_Paper.pdf).
Biet, M., Giraud, F. and Lemaire-Semail, B. (2008) 'Implementation of tactile feedback by modifying the perceived fiction', The European Physical Journal—Applied Physics, 43(1), pp. 123-135. (http://journals.cambridge.org/action/displayAbstract?fromPage=online&aid=8023980).
Raffle, et al. "Super Cilia Skin: An Interactive Membrane" CHI 2003, Apr. 5-10, 2003, Ft. Lauderdale, Florida, USA. ACM 1-58113-630-7/03/0004. (http://www.hayesraffle.com/projects/super-cilia-skin).
Bau, et al. "TeslaTouch: Electrovibration for Touch Surfaces" UIST'10, Oct. 3-6, 2010, New York, New York, USA. Copyright 2010 ACM 978-1-4503-0271-5/10/10(http://www.disneyresearch.com/project/teslatouch/).
Iliaifar, Amir "Magna Intelligent Surface Technology: Like Controlling Your Car with an iPhone" DigitalTrends.com, May 17, 2012. (http://www.digitaltrends.com/cars/magna-intelligent-surface-technology-like-controlling-your-car-with-an-iphone/).
Coxworth, Ben "Magnetic microhair material can change transparency, and make water flow uphill" NewAtlas.com Aug. 8, 2014. (http://newatlas.com/magnetic-microhair-material/33291/).
Yoo, et al. "PneUI: Pneumatically Actuated Soft Composite Materials for Shape Changing Interfaces" UIST'13, Oct. 8-11, 2013, St. Andrews, United Kingdom. Copyright © 2013 ACM 978-1-4503-2268-3/13/10. (http://tmg-trackr.media.mit.edu/publishedmedia/Papers/528-PneUI%20Pneumatically%20Actuated%20Soft/Published/PDF).
Pflug, Enno, Continental Press Portal "Study: Next Generation Touchpad with Haptic Feedback Makes Control Tasks Easier and Safer" Nov. 8, 2013 (http://www.continental-corporation.com/www/servlet/pdf/9280786/pr_2013_11_08_touchpad_en.pdf).

* cited by examiner

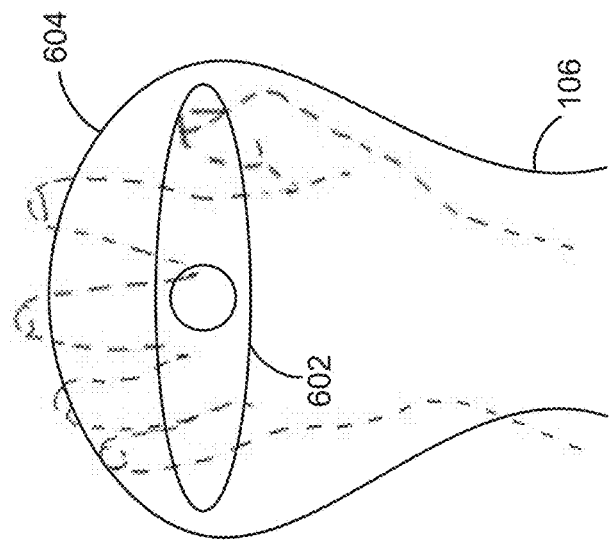
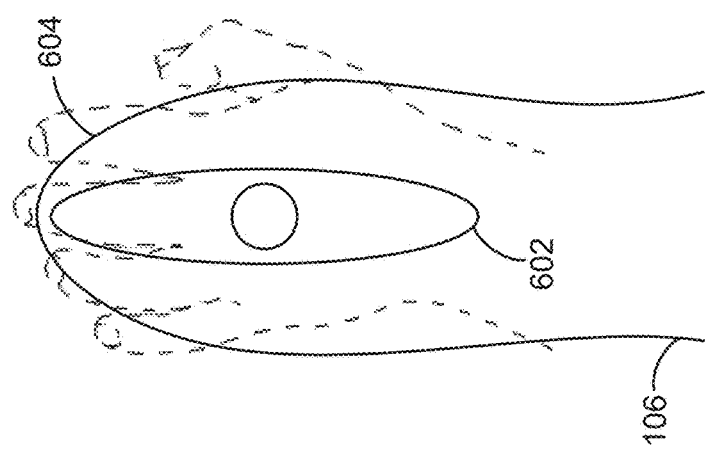

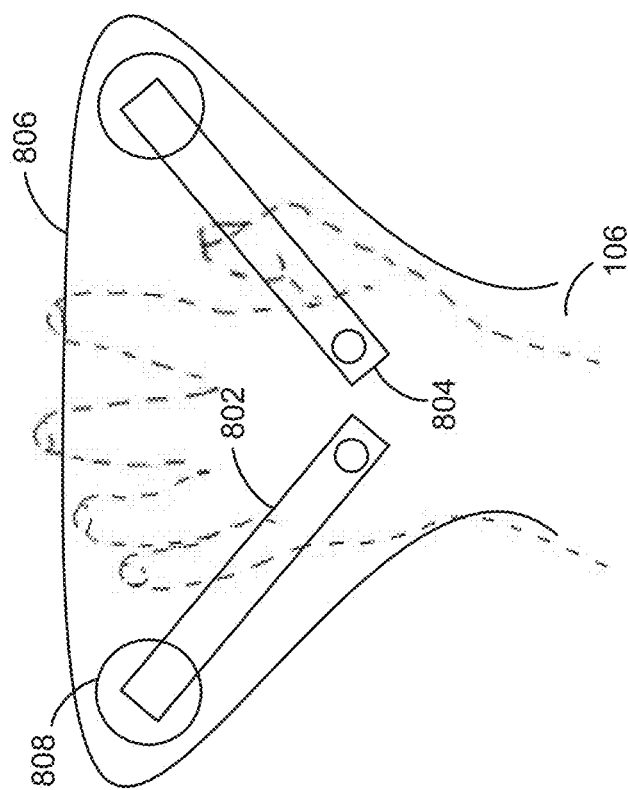
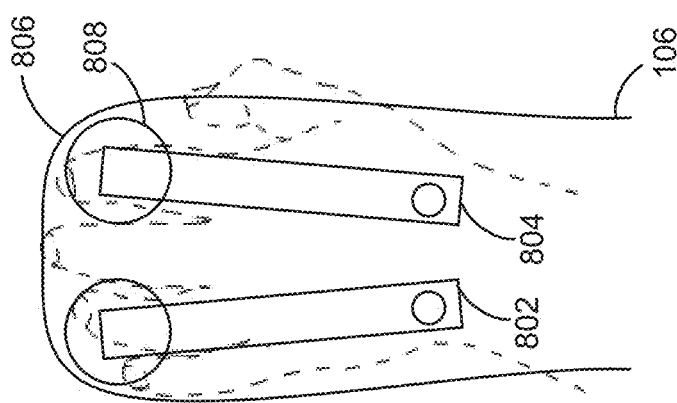
FIG. 8B
FIG. 8A

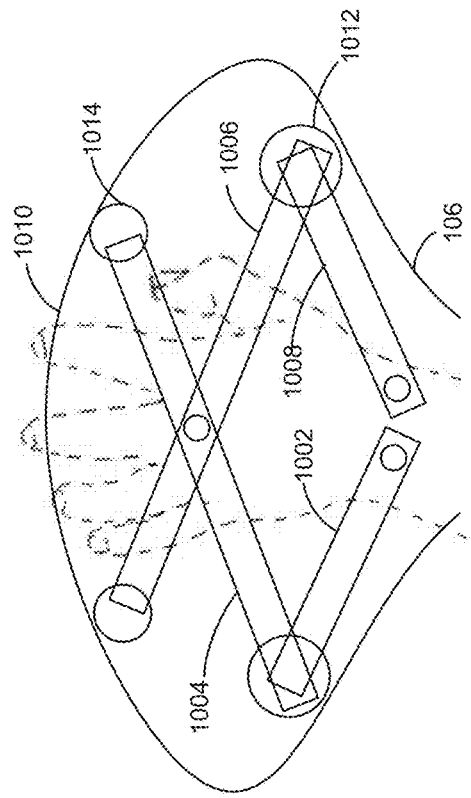
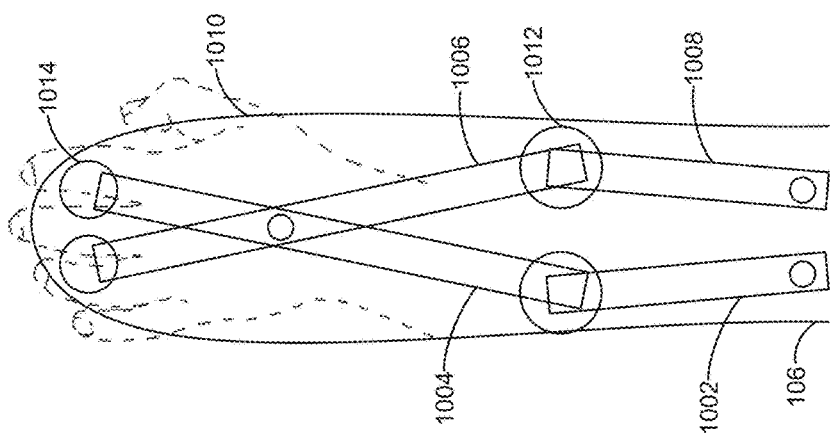
FIG. 10B
FIG. 10A

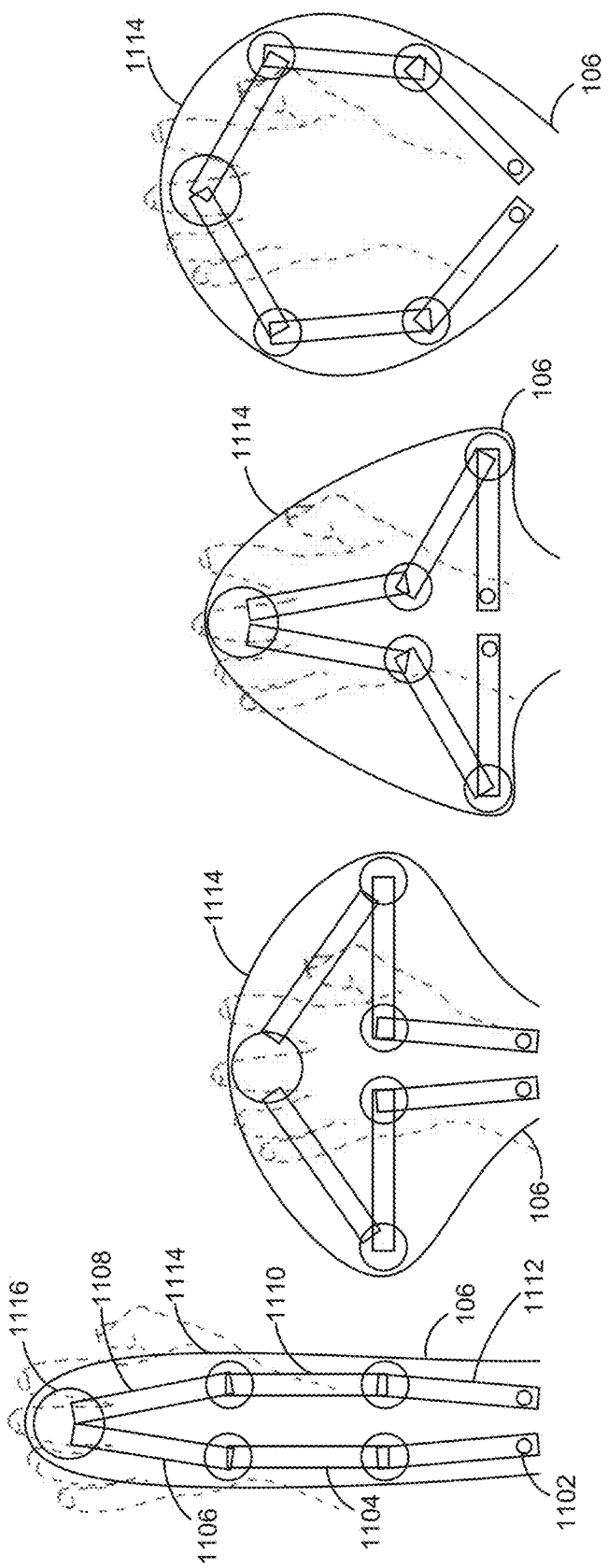

SHAPE-CHANGING SURFACE

CROSS-REFERENCE TO RELATED APPLICATIONS

This application claims benefit of the U.S. Provisional Patent Application having Ser. No. 62/098,958 and filed on Dec. 31, 2014. The subject matter of this related application is hereby incorporated herein by reference.

BACKGROUND

Field of the Various Embodiments

The various embodiments relate generally to vehicle control systems and, more specifically, to a shape-changing surface.

Description of the Related Art

User interfaces provide a mechanism for humans to interact with machines and computer-based systems. Vehicle control systems, such as in-vehicle infotainment (IVI) systems, include user interfaces that allow a driver or passenger to operate and control various functions of the vehicle, such as adjusting the volume of a sound system, accepting an incoming cellular phone call, entering a destination address into a navigation system, and playing a media file. Touch screens, buttons, knobs, and other devices may be used to operate and control the functions of a vehicle control system. Vehicle control systems also may provide functionality associated with movement of the vehicle, such as steering, increasing speed, decreasing speed, and braking.

Depending on the current mode of an IVI system, a particular type of input may cause different functions to occur. For example, a swipe-forward gesture on a touch screen while the IVI system is in a navigation mode may cause the screen to pan a map. On the other hand, inputting the same swipe-forward gesture while the system is in a music playback mode may cause the next song to be played. To assist a user in operating the IVI system, the touch screen may indicate whether the IVI system is in the navigation mode or the music playback mode.

Despite the availability of different devices for operating vehicle control systems, various issues can affect a driver's ability to pay sufficient attention to the road while operating a vehicle control system. For example, before providing input to an IVI system, a driver may need to look away from the road and towards a screen in order to determine the current mode of the IVI system. Additionally, the driver may have to look at the screen to determine which actions can be performed in a particular mode. A particular mode of the IVI system may accept swiping gestures as input, whereas another mode may not. By looking at the screen, the driver is unable to effectively pay attention to the road, increasing the likelihood that the driver will collide with an object in the surrounding environment.

As the foregoing illustrates, more effective techniques for interacting with a vehicle control system would be useful.

SUMMARY

One or more embodiments set forth a system for changing the shape of a vehicle component. The system includes one or more actuators coupled to the vehicle component and a processor coupled to the one or more actuators. The processor is configured to determine that a software application has switched from a first mode to a second mode and cause the one or more actuators to transition a surface of the vehicle component from a first shape associated with the first mode to a second shape associated with the second mode.

Further embodiments provide, among other things, a method and a computer-readable storage medium to implement various aspects of the system set forth above.

Advantageously, the disclosed techniques enable a user to operate a vehicle control system without requiring the user to look at a user interface, such as a screen. Thus, the disclosed techniques, among other things, increase the ability of a user to pay attention to driving conditions while safely and efficiently operating a vehicle control system.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

FIGS. 6A and 6B illustrate a top view of a rotary rod that may be implemented with the armrest of FIG. 1, according to various embodiments;

FIGS. 8A and 8B illustrate a top view of two hinged rods with wheels that may implemented with the armrest of FIG. 1, according to various embodiments;

FIGS. 10A and 10B illustrate a top view of four hinged rods and four wheels that may be implemented with the armrest of FIG. 1, according to various embodiments;

FIGS. 11A, 11B, 11C, and 11D illustrate a top view of six hinged rods and wheels that may be implemented with the armrest of FIG. 1, according to various embodiments;

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

Figure 1:
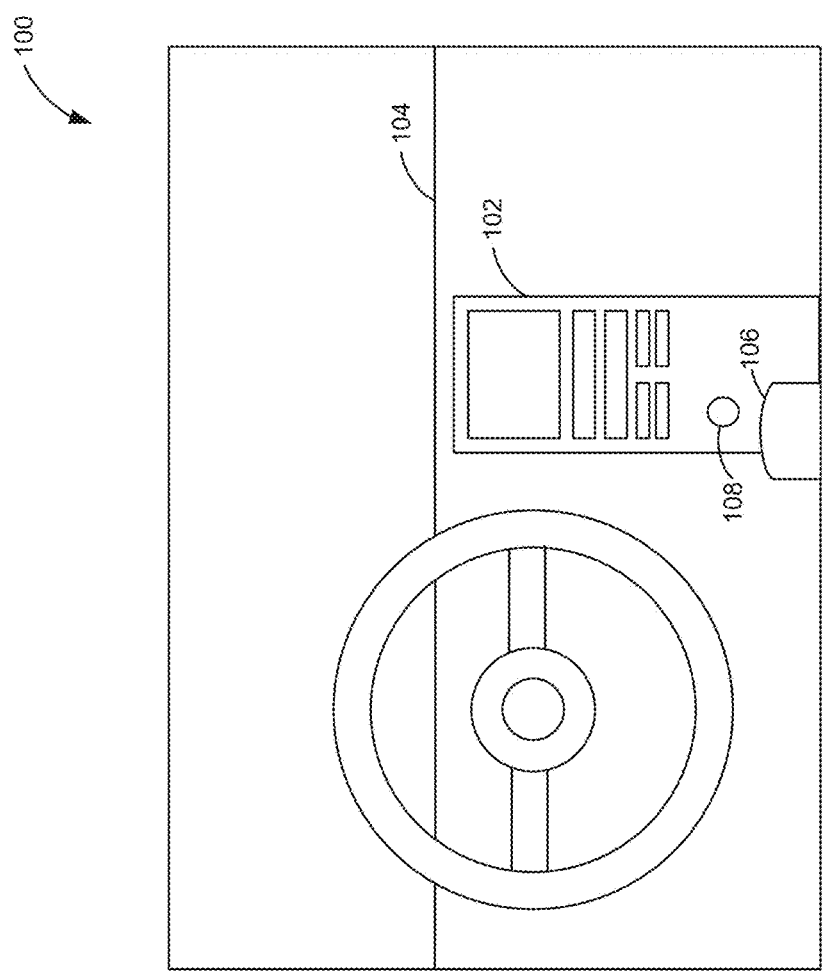
FIG. 1 illustrates a passenger compartment of a vehicle in which a vehicle control system may be implemented, according to various embodiments.

FIG. 1 illustrates a passenger compartment 100 of a vehicle in which a vehicle control system 102 may be implemented, according to various embodiments. As shown, the passenger compartment 100 includes the vehicle control system 102 positioned proximate a dashboard 104 providing various instrumentation for a driver of a vehicle. The vehicle control system 102 includes different vehicle components, such as an armrest 106 and a knob 108. In various embodiments, the armrest 106 and/or the knob 108 are configured to change shape. Further, in some embodiments, the vehicle control system 102 may include one or more other vehicle components instead of, or in addition to, the armrest 106 and/or the knob 108 that are configured to change shape in a similar manner as described below with respect to the armrest 106 and the knob 108.

One or more shapes of the armrest 106 and/or the knob 108 each may correspond to one or more respective modes of the vehicle control system 102. In some embodiments, a mode of the vehicle control system 102 may correspond to a particular application executing on a computing device of the vehicle control system 102. For example, and without limitation, a first mode of the vehicle control system 102 may be associated with execution of a first application that provides a first set of functions (e.g., navigation functions) and a second mode of the vehicle control system 102 may be associated with execution of a second application that provides a second set of functions (e.g., cellular phone functions). Moreover, in various embodiments, different shapes of the armrest 106 and/or the knob 108 may correspond to different modes, and a particular shape of the armrest 106 and/or knob 108 may be associated with parameters that can be adjusted in the corresponding mode. Consequently, by touching the armrest 106 and/or the knob 108, a driver can determine the current mode and what parameters are being controlled without needing to look away from the road.

In operation, the vehicle control system 102 accepts input and provides information (e.g., navigation instructions) to a user, such as a driver or passenger. For example, and without limitation, the vehicle control system 102 could accept input including a destination, a request for road information or vehicle information, and a request for navigation instructions. In yet other embodiments, the vehicle control system 102 is configured to display controls to the user for controlling functions of various devices within the vehicle. Such functions may include, without limitation, audio functions, video functions, internet functions, climate control functions, cellular phone functions, steering functions, acceleration functions, deceleration functions, braking functions, external lighting functions, window functions, door locking and unlocking functions, and the like.

Although the vehicle control system 102 is illustrated as being embedded in the center of the dashboard 102, the vehicle control system 102 may alternatively be located in any other technically feasible region of the passenger compartment 100 and/or may include a standalone module.

Figure 2:
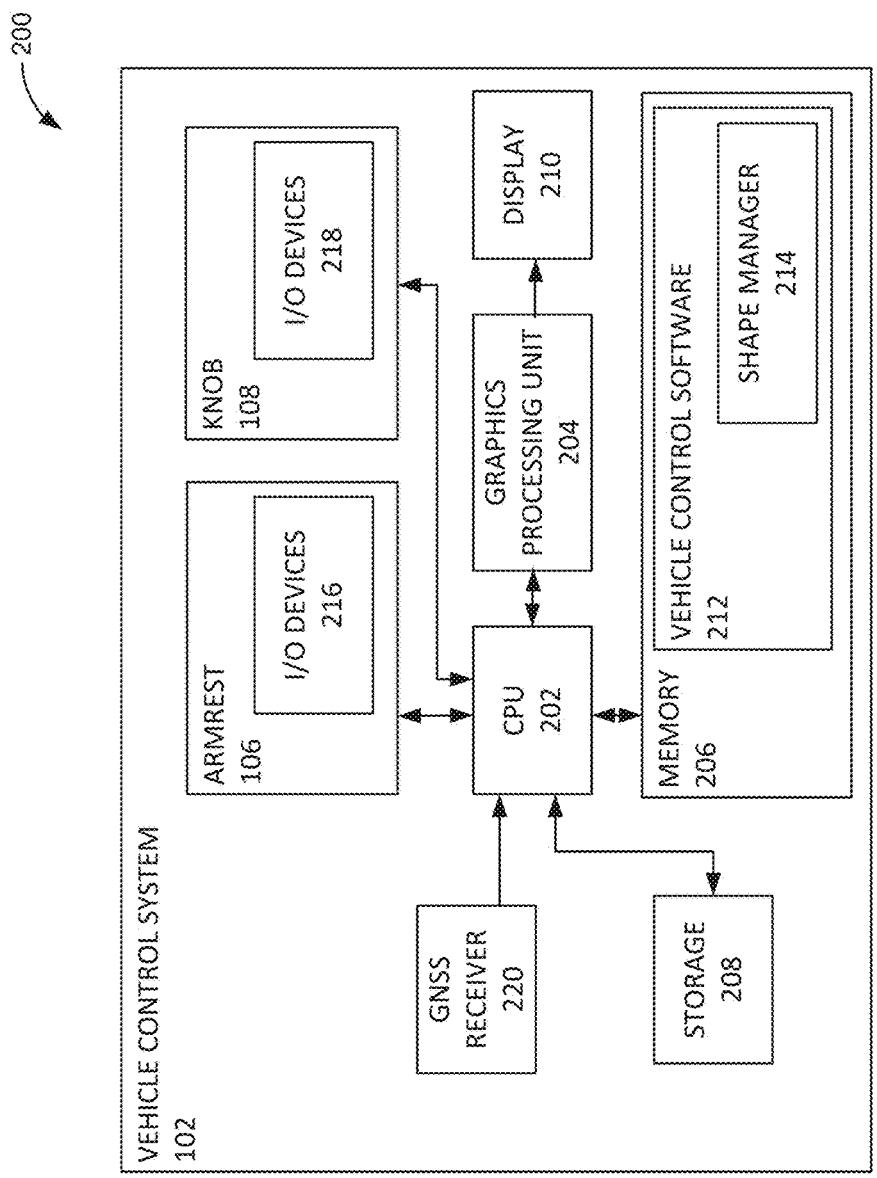
FIG. 2 is a block diagram of the vehicle control system of FIG. 1, according to various embodiments.

FIG. 2 is a block diagram 200 of the vehicle control system 102 of FIG. 1, according to various embodiments. As shown, the vehicle control system 102 includes a central processing unit (CPU) 202, a graphics processing unit (GPU) 204, memory 206, storage 208, a display 210, an armrest 106, and a knob 108.

The CPU 202 generally comprises a programmable processor that executes program instructions to manipulate input data. The CPU 202 may include any number of processing cores, memories, and other modules for facilitating program execution. The memory 206 generally comprises one or more memory modules, such as a random access memory (RAM) module, that store applications and data for processing by the CPU 202. For example, and without limitation, the memory 206 includes vehicle control software 212. The vehicle control software includes software for providing information associated with a current mode of the vehicle control system 102 and infotainment-related information such as navigation and multimedia information. The vehicle control software 212 also includes software for controlling the different devices associated with the vehicle control system 102.

As shown, the vehicle control software 212 of the memory 206 includes a shape manager 214 for providing functionality associated with the armrest 106 and the knob 108. The vehicle control software 212 and the shape manager 214 are configured to receive input signals from and to send output signals to I/O devices 216 of the armrest 106, I/O devices 218 of the knob 108, the display 210, and various other devices of the vehicle control system 102. I/O devices 216 and I/O devices 218 may include any types of devices capable of processing input and/or output.

In some embodiments, I/O devices 216 and I/O devices 218 may include one or more sensors for detecting touch input received from a user and for sending input signals associated with the touch input to the vehicle control software 212 and/or the shape manager 214, as described in detail below. For example, and without limitation, the one or more sensors may include pressure sensors, capacitive sensors, temperature sensors, and other suitable sensors for detecting touch input. In some embodiments, I/O devices 216 and I/O devices 218 may include one or more moveable devices configured to cause one or more portions of the armrest 106 and/or the knob 108 to change shape in response to receiving output signals generated via the shape manager 214, as described in detail below. For example, and without limitation, the one or more moveable devices may include actuators, rods, solenoids, wheels, inflatable bladders, servos, particle jammers, shape memory alloys, shape memory polymers, thermoplastics, dielectric electoreactive polymers, electromagnets, and any other suitable devices and materials for causing one or more portions of the armrest 106 and/or the knob 108 to change shape.

The GPU 204 generally comprises a programmable or fixed function processor that accepts commands and data from the CPU 202 and generates pixels for display on the display 210. The input/output devices 216 may include various types of devices capable of processing input and/or output, such as buttons, a microphone, cameras, a touch-based input device integrated with display device 210 (i.e., a touch screen), and other devices for providing input to and/or output from the vehicle control system 102. As shown, the input/output devices 216 include an armrest 106 and a knob 108.

In various embodiments, the storage 208 includes non-volatile memory such as optical drives, magnetic drives, flash drives, or other storage. The global navigation satellite system (GNSS) receiver 220 determines global position of the vehicle control system 102. In various embodiments, the vehicle control software 212 accesses global positioning information from the GNSS receiver 220 in order to determine a current location of the vehicle.

In some embodiments, the CPU 202 is the master processor of the vehicle control system 102, controlling and coordinating operation of other system components. In particular, the CPU 202 receives input and/or sends output via I/O devices 216 and/or I/O devices 218 and executes the vehicle control software 212 and the shape manager 214 stored in the memory 206 to cause one or more portions of the armrest 106 and/or the knob 108 to change shape, to cause infotainment-oriented information and vehicle control information to be displayed on the display 210, and to implement functions of various other devices of a vehicle. For example, and without limitation, when the vehicle control system 102 is in a navigation mode, the display 210 may display maps and other navigation-related information. When the vehicle control system 102 is in a music playback mode, the display 210 may display a song and other music-related information. When the vehicle control system 102 is in a communications mode, the display 210 may display a time duration of a phone call and other call-related information. When the vehicle control system 102 is in a cruise control mode, the display 210 may display a speed of the car and other vehicle information. In various embodiments, any of the above information may be scrolled through and/or selected based on receiving user input, such as touch input on the armrest 106 or the knob 108.

In some embodiments, the shape of the armrest 106 and/or the knob 108 corresponds to one or more types of input that the armrest 106 or the knob 108 is configured to receive. For example, and without limitation, a round shape may correspond to a configuration for rotary touch input on the armrest 106 or the knob 108. A long and narrow shape may correspond to a configuration for touch input along the length of the armrest 106 or the knob 108, which may correspond to scrolling information up or down on the display 210 or moving elements up or down on the display 210. A wide shape may correspond to a configuration for touch input along the width of the armrest 106 or the knob 108, which may correspond to scrolling information left or right on the display 210 or moving elements left or right on the display 210. Furthermore, when the armrest 106 or the knob 108 changes from a first shape associated with a first mode to a second shape associated with a second mode, one or more physical features associated with touch input such as bumps or indentations may be removed from the armrest 106 or the knob 108, and one or more new physical features associated with touch input such as bumps or indentations may be added to the armrest 106 or the knob 108. Moreover, one or more of the new physical features may be located at one or more corresponding portions of the surface of the armrest 106 or knob 108 that are different than one or more locations of the removed physical features.

Figure 3:
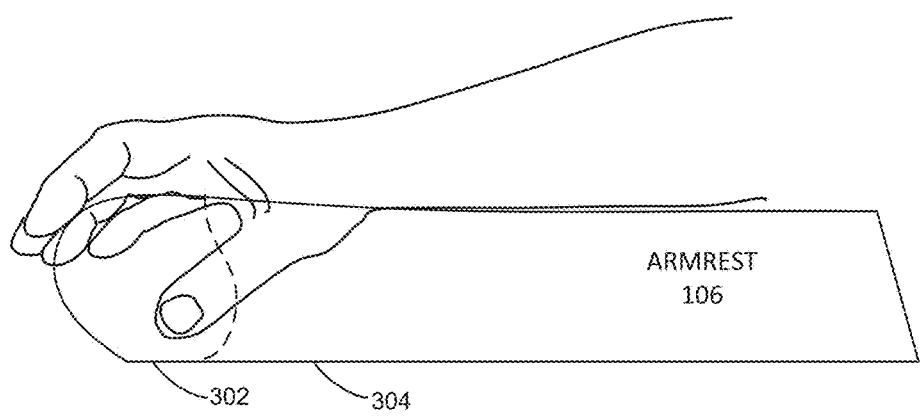
FIG. 3 illustrates a side view of a touch-sensitive area that may be implemented with the armrest of FIG. 1, according to various embodiments.

FIG. 3 illustrates a side view of a touch-sensitive area that may be implemented with the armrest 106 vehicle control system 102 of FIG. 1, according to various embodiments. In the example embodiment, the armrest 106 includes the touch-sensitive area 302 and an inactive area 304 that a driver uses for ergonomic support of an arm and/or wrist. In various embodiments, the shape manager 214 causes one or more actuators to change the shape of the touch-sensitive area 302 by making one or more portions of the touch-sensitive area 302 longer, wider, taller, or shorter in one or more portions. Thus, a user may receive feedback indicating a current mode of the vehicle control system 102 via a hand and/or wrist as one or more portions of the armrest 106 change shape.

In some embodiments, the shape manager 214 may receive touch input from the touch-sensitive area 302 via one or more sensors or other devices associated with the touch-sensitive area 302. For example, and without limitation, sensors may detect touch input from the touch-sensitive area 302 in response to one or more of a user's fingers touching, pushing, or moving along the touch-sensitive area 302. Furthermore, the sensors may detect touch input associated with other body parts, such as the user's palm, thumb, and wrist.

Figure 4:
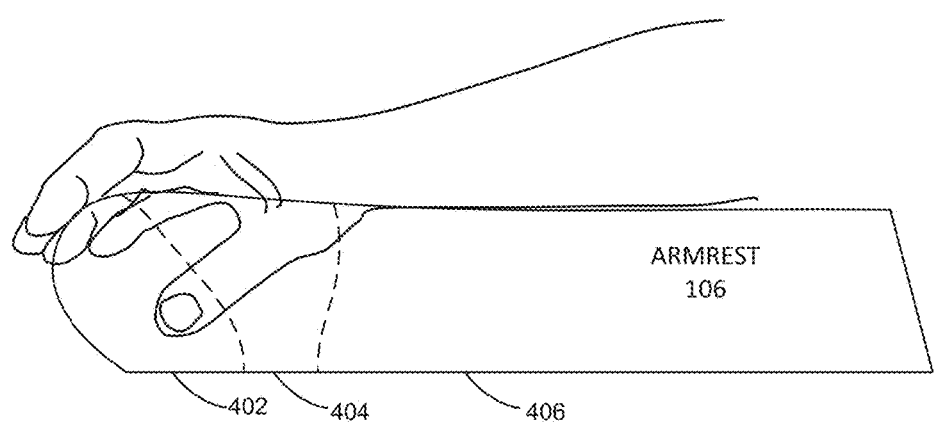
FIG. 4 illustrates a side view of multiple touch-sensitive areas that may be implemented with the armrest of FIG. 1, according to various embodiments.

FIG. 4 illustrates a side view of multiple touch-sensitive areas that may be implemented with the armrest 106 of the vehicle control system 102 of FIG. 1, according to various embodiments. In the example embodiment, the armrest 106 includes the finger touch-sensitive area 402, the palm touch-sensitive area 404, and an inactive area 406 that a driver uses for ergonomic support of an arm and/or wrist. In various embodiments, the shape manager 214 may cause the finger touch-sensitive area 402 and/or the palm touch-sensitive area 404 to change shape by becoming elongated, wider, taller, or shorter in one or more portions. Thus, a user may receive feedback indicating a current mode of the vehicle control system 102 via a hand and/or wrist as one or more portions of the armrest 106 change shape.

In some embodiments, the shape manager 214 may receive touch input from the finger touch-sensitive area 402 and/or the palm touch-sensitive area 404 via one or more sensors or other devices associated with the finger touch-sensitive area 402 and/or the palm touch-sensitive area 404. For example, and without limitation, sensors may detect touch input from the finger touch-sensitive area 402 in response to one or more of a user's fingers touching, pushing, or moving along the touch-sensitive area 402. As another example, and without limitation, sensors may detect touch input from the palm touch-sensitive area 404 in response to the user's palm touching, pushing, or moving along the palm touch-sensitive area 404. The sensors may also detect touch input associated with other body parts, such as the user's palm, thumb, and wrist.

Furthermore, one or more touch-sensitive areas, such as the touch-sensitive areas of the armrest 106 as discussed for FIGS. 3 and 4 above, may be implemented in conjunction with various other embodiments of the armrest 106 and/or knob 108, including those described below. In some embodiments, the palm touch-sensitive area 404 is a mixed use area in that a user's palm may naturally rest on the touch-sensitive area 404 or may be used to push down a controller or extension of a controller. Therefore, the palm touch-sensitive area 404 may operate independent from the finger touch-sensitive area 402.

In the embodiments described below, the shape manager 214 may generate one or more signals to cause the armrest 106 and/or the knob 108 to change shape. Furthermore, each shape of the armrest 106 and/or knob 108 caused by the shape manager 214 may correspond to a different mode of the vehicle control system 102. In various embodiments, a flexible surface of the armrest 106 and/or the knob 108 may be composed of rubber and/or any other suitable material capable of expanding, contracting, and deforming without tearing. Moreover, in the embodiments described below, one or more shape-changing devices may be configured to cause the armrest 106 to expand and/or contract in one or more of a lateral direction, vertical direction, or longitudinal direction (e.g., x, y, or z axis). Thus, any of the above features may be generally applicable to the shape-changing embodiments described below.

Figure 5:
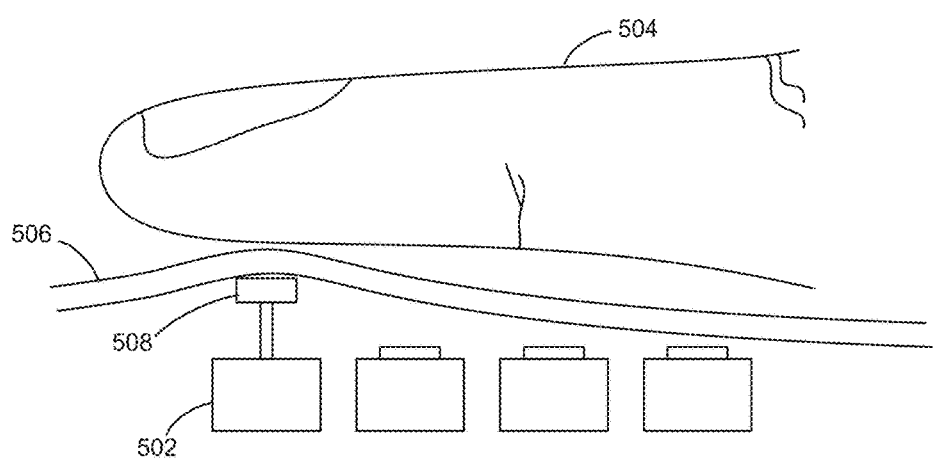
FIG. 5 illustrates a technique for changing the shape of a portion of the armrest of FIG. 1 via actuators, according to various embodiments.

FIG. 5 illustrates a technique for changing the shape of a portion of the surface of the armrest 106 of FIG. 1 via actuators 502, according to various embodiments. In the example embodiment, the portion of the surface of the armrest 106 may be the finger touch-sensitive area 402, the palm touch-sensitive area 404, and/or any other portion of the armrest 106 suitable for interaction via fingers, hands, or other body parts. One or more actuators 502 may be configured to receive output signals generated via the shape manager 214 in order to activate the one or more actuators 502. In the example embodiment, a user's finger 504 is in contact with the surface 506 of the armrest 106. The finger 504 may be in contact with a touch-sensitive area, such as the finger touch-sensitive area 402. As shown, an actuator 502 includes a moveable portion 508 that moves toward the surface 506 when the actuator 502 is activated by the shape manager 214 to cause the surface 506 to change shape.

In the example, and without limitation, the actuator 502 causes a bump to form on the surface 506, which a user can feel via the user's finger 504 and/or one or more other body parts. In some embodiments, the actuator 502 retracts to form an indentation on the surface 506. Additionally, one or more other actuators may be activated to cause additional changes in the shape of the surface 506 on one or more portions of the armrest 106. Furthermore, in some embodiments, the moveable portion 508 of each actuator 502 may move towards or away from the surface 506 by one or more different distances, depending on the received output signal. Therefore, a variety of shapes of the armrest 106 can be maintained by the actuators 502 via the shape manager 214, depending on which actuators 502 are activated and how far each moveable portion 508 travels. In some embodiments, one or more independent actuators 502 may be located underneath each of a user's fingers. Furthermore, one or more of the actuators 502 that are adjacent to each other may operate via the shape manager 214 independently or in combination with each other. Moreover, a different sensor and corresponding touch input may be associated with each actuator 502.

FIGS. 6A and 6B illustrate a top view of a rotary rod 602 that may be implemented with the armrest 106 of FIG. 1, according to various embodiments. The rotary rod 602 may be configured to receive output signals generated via the shape manager 214 to cause the rotary rod 602 to rotate by a certain amount, such as by a certain number of degrees clockwise or counter-clockwise. The rotation of the rotary rod 602 may be implemented through a servo or other device.

As shown in FIG. 6A, the rotary rod 602 is in a first position, causing a flexible surface 604 of the armrest 106 to take on an elongated shape. The rotary rod 602 may receive a signal generated via the shape manager 214 causing the rotary rod 602 to move to a second position as shown in FIG. 6B. In some embodiments, the first position of the rotary rod 602 is perpendicular to the second position of the rotary rod 602. Thus, movement of the rotary rod 602 causes the shape of the armrest 106 to change from the elongated shape of FIG. 6A to the wider and rounder shape of FIG. 6B.

In the example embodiment, the pinky and thumb are spread apart more in FIG. 6B than in FIG. 6A and the one or more fingers, such as the middle finger, is bent down more in FIG. 6B than in FIG. 6A. In some embodiments, the position of the rotary rod 602 may rotate to one of multiple positions in between the first and second position, where each of the multiple positions causes the armrest 106 to take on a different shape.

Figure 7B:
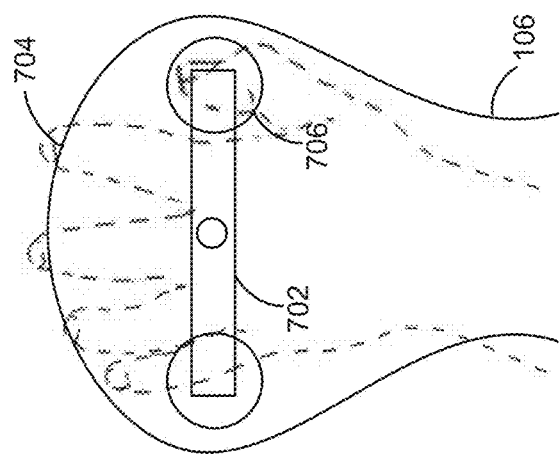
FIGS. 7A and 7B illustrate a top view of a rotary rod with wheels that may be implemented with the armrest of FIG. 1, according to various embodiments.
Figure 7A:
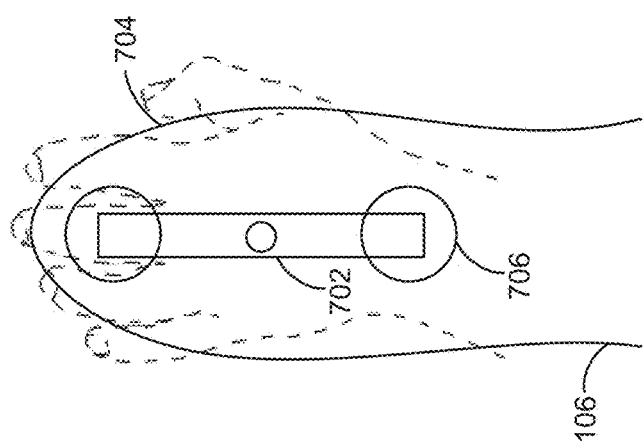

FIGS. 7A and 7B illustrate a top view of a rotary rod 702 with wheels that may be implemented with the armrest 106 of FIG. 1, according to various embodiments. The rotary rod 702 may be configured to receive output signals generated via the shape manager 214 in order to cause the rotary rod 702 to rotate by a certain amount, such as by a certain number of degrees clockwise or counter-clockwise. The rotation of the rotary rod 702 may be implemented through a servo or other device.

As shown in FIG. 7A, the rotary rod 702 is in a first position, causing a flexible surface 704 of the armrest 106 to take on an elongated shape. In the example embodiment, the rotary rod 702 has a wheel 706 at each end. The wheels 706 are at the extremities of the rotary rod 702 to facilitate movements of the rotary rod 702 within the flexible surface 704. The rotary rod 702 may receive a signal generated via the shape manager 214 causing the rotary rod 702 to move to a second position as shown in FIG. 7B. In some embodiments, the first position of the rotary rod 702 is perpendicular to the second position of the rotary rod 702. Thus, movement of the rotary rod 702 causes the shape of the armrest 106 to change from the elongated shape of FIG. 7A to the wider and rounder shape of FIG. 7B.

In FIG. 7B, the pinky and thumb are spread apart more and the fingers are bent down more. In some embodiments, the position of the rotary rod 702 may rotate to one of multiple positions in between the first and second position, where each of the multiple positions causes the armrest 106 to take on a different shape.

FIGS. 8A and 8B illustrate a top view of two hinged rods 802, 804 with wheels that may implemented with the armrest 106 of FIG. 1, according to various embodiments. The left hinged rod 802 and the right hinged rod 804 may receive output signals generated via the shape manager 214 to cause the left hinged rod 802 and/or the right hinged rod 804 to rotate by a certain amount, such as by a certain number of degrees clockwise or counter-clockwise. Rotation of the left hinged rod 802 and/or the right hinged rod 804 may be implemented via a servo or other device.

As shown in FIG. 8A, the hinged rods 802, 804 are at a first position, causing a flexible surface 806 of the armrest 106 to take on an elongated shape. In the example embodiment, each of the hinged rods 802, 804 has a wheel 808 at one end. The wheels 808 of the hinged rods 802, 804 facilitate movements of the hinged rods 802, 804 within the flexible surface 806. The hinged rods 802, 804 may receive a signal generated via the shape manager 214, causing the hinged rods 802, 804 to move to a second position, as shown in FIG. 8B. Thus, the counter-clockwise rotation of the left hinged rod 802 and the clockwise rotation of the right hinged rod 804 causes the shape of the armrest 106 to change from the elongated shape of FIG. 8A to the wider and rounder shape of FIG. 8B. In FIG. 8B, the pinky and thumb are spread apart more and the fingers are bent down more. In some embodiments, the left hinged rod 802 may rotate to one of multiple positions and the right hinged rod 802 may rotate to one of multiple positions, where the various multiple positions cause the armrest 106 to take on different shapes.

Figure 9B:
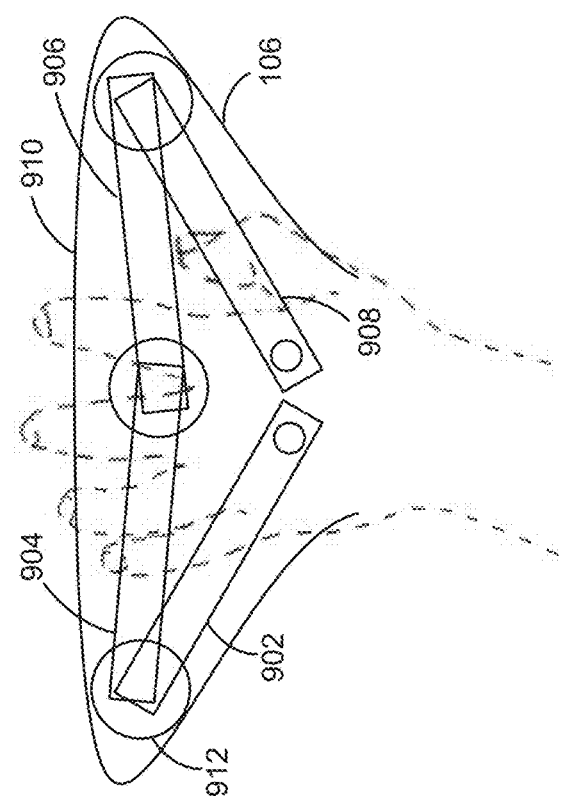
FIGS. 9A and 9B illustrate a top view of four hinged rods and three wheels that may be implemented with the armrest of FIG. 1, according to various embodiments.
Figure 9A:
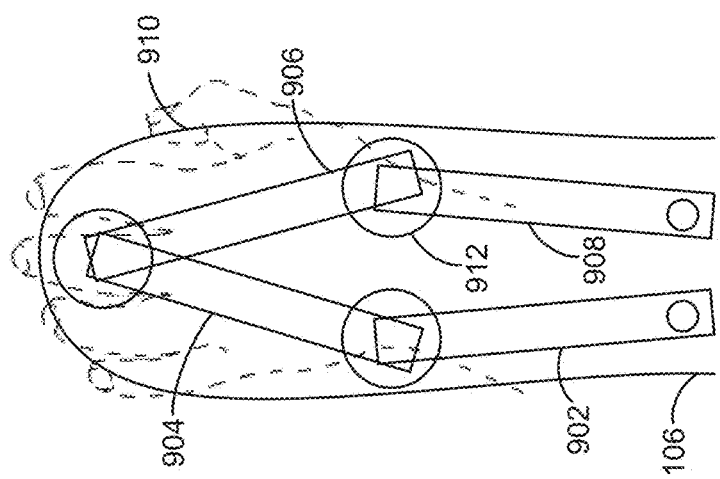

FIGS. 9A and 9B illustrate a top view of four hinged rods 902, 904, 906, 908 and three wheels that may be implemented with the armrest 106 of FIG. 1, according to various embodiments. A lower-left hinged rod 902, upper-left hinged rod 904, upper-right hinged rod 906, and a lower-right hinged rod 908 may be configured to receive output signals generated via the shape manager 214 to cause movement of a respective rod. In the example embodiment, the lower-left hinged rod 902 and/or the lower-right hinged rod 908 may be configured to receive output signals generated via the shape manager 214 to cause the lower-left hinged rod 902 and/or lower-right hinged rod 908 to rotate by a certain amount, such as by a certain number of degrees clockwise or counter-clockwise. The rotation of the lower-left hinged rod 902 and/or the lower-right hinged rod 908 may be implemented through a respective servo or other device.

As shown in FIG. 9A, the hinged rods 902, 904, 906, 908 are in a first position, causing a flexible surface 910 of the armrest 106 to take on an elongated shape. In the example embodiment, a wheel 912 connects the lower-left hinged rod 902 to the upper-left hinged rod 904, the upper-left hinged rod 904 to the upper-right hinged rod 906, and the upper-right hinged rod 906 to the lower-right hinged rod 908. The wheels 912 facilitate movements of the hinged rods 902, 904, 906, 908 within the flexible surface 910. In the example embodiment, the wheels 912 also serve as a point of rotation for the hinged rods 902, 904, 906, 908. The hinged rods 902, 908 may receive a signal generated via the shape manager 214 causing the hinged rods 902, 908 to move to a second position as shown in FIG. 9B. Thus, the counter-clockwise rotation of the lower-left hinged rod 902 and the clockwise rotation of the lower-right hinged rod 908 causes the shape of the armrest 106 to change from the elongated shape of FIG. 9A to the wider and rounder shape of FIG. 9B. The wider shape causes the pinky and thumb to be spread apart more and the fingers to bend down more. In some embodiments, the lower-left hinged rod 902 may rotate to one of multiple positions and the lower-right hinged rod 908 may rotate to one of multiple positions, where the various positions cause the armrest 106 to take on different shapes.

FIGS. 10A and 10B illustrate a top view of four hinged rods 1002, 1004, 1006, 1008 and four wheels that may be implemented with the armrest 106 of FIG. 1, according to various embodiments. A lower-left hinged rod 1002, upper-left hinged rod 1004, upper-right hinged rod 1006, and a lower-right hinged rod 1008 may be configured to receive output signals generated via the shape manager 214 to cause movement of a respective rod. In the example embodiment, the lower-left hinged rod 1002 and the lower-right hinged rod 1008 may be configured to receive output signals generated via the shape manager 214 in order to cause the lower-left hinged rod 1002 and/or lower-right hinged rod 1008 to rotate by a certain amount, such as by a certain number of degrees clockwise or counter-clockwise. The rotation of the lower-left hinged rod 1002 and the lower-right hinged rod 1008 may be implemented through a respective servo or other device.

As shown in FIG. 10A, the hinged rods 1002, 1004, 1006, 1008 are at a first position, causing a flexible surface 1010 of the armrest 106 to take on an elongated shape. In the example embodiment, a wheel 1012 connects the lower-left hinged rod 1002 to the upper-left hinged rod 1004 and the upper-right hinged rod 1006 to the lower-right hinged rod 1008. Furthermore, a wheel 1014 is located at the end of the upper-left hinged rod 1004 and the upper-right hinged rod 1006. The upper-left hinged rod 1004 and the upper-right hinged rod 1006 also are connected to each other at a rotational point in a middle area of each rod 1004, 1006. The wheels 1012, 1014 facilitate movement of the hinged rods 1002, 1004, 1006, 1008 within the flexible surface 1010.

In the example embodiment, the wheels 1012 also serve as a point of rotation for the hinged rods 1002, 1004, 1006, 1008. The hinged rods 1002, 1008 may receive a signal generated via the shape manager 214 causing the hinged rods 1002, 1008 to move to a second position as shown in FIG. 10B. Thus, the counter-clockwise rotation of the lower-left hinged rod 1002 and the clockwise rotation of the lower-right hinged rod 1008 causes the shape of the armrest 106 to change from the elongated shape of FIG. 10A to the wider and rounder shape of FIG. 10B. The wider shape causes the pinky and thumb to be spread apart more and the fingers to bend down more. In some embodiments, the lower-left hinged rod 1002 may rotate to one of multiple positions and the lower-right hinged rod 1008 may rotate to one of multiple positions, where the various multiple positions cause the armrest 106 to take on different shapes.

FIGS. 11A and 11B illustrate a top view of six hinged rods 1102, 1104, 1106, 1108, 1110, 1112 and wheels that may be implemented with the armrest 106 of FIG. 1, according to various embodiments. A lower-left hinged rod 1102, middle-left hinged rod 1104, upper-left hinged rod 1106, upper-right hinged rod 1108, middle-right hinged rod 1110, and an lower-right hinged rod 1112 may receive output signals generated via the shape manager 214 to cause movement of a respective rod. In the example embodiment, the lower-left hinged rod 1102 and the lower-right hinged rod 1112 may be configured to receive output signals generated via the shape manager 214 in order to cause the lower-left hinged rod 1102 and/or lower-right hinged rod 1112 to rotate by a certain amount, such as by a certain number of degrees clockwise or counter-clockwise. The rotation of the lower-left hinged rod 1102 and the lower-right hinged rod 1112 may be implemented through a respective servo or other device.

As shown in FIG. 11A, the hinged rods 1102, 1104, 1106, 1108, 1110, 1112 are in first position, causing a flexible surface 1114 of the armrest 106 to take on an elongated shape. In the example embodiment, a wheel 1116 connects the lower-left hinged rod 1102 to the middle-left hinged rod 1104, the middle-left hinged rod 1104 to the upper-left hinged rod 1106, the upper-left hinged rod 1106 to the upper-right hinged rod 1108, the upper-right hinged rod 1108 to the middle-right hinged rod 1110, and the middle-right hinged rod 1110 to the lower-right hinged rod 1112. The wheels 1116 facilitate movements of the hinged rods 1102, 1104, 1106, 1108, 1110, 1112 within the flexible surface 1114. In the example embodiment, the wheels 1116 also serve as a point of rotation for the hinged rods 1102, 1104, 1106, 1108, 1110, 1112. One or more of the hinged rods 1102, 1104, 1106, 1108, 1110, 1112 may receive a signal generated via the shape manager 214 causing the hinged rods 1102, 1104, 1106, 1108, 1110, 1112 to move to a second position as shown in FIG. 11B, a third position as shown in 11C, and a fourth position as shown in 11D, depending on the type of signal received.

Thus, the counter-clockwise rotation or clock-wise rotation of one or more of the hinged rods 1102, 1104, 1106, 1108, 1110, 1112 causes the shape of the armrest 106 and the flexible surface 1114 to change from the elongated shape of FIG. 11A to the different wider and rounder shapes of FIGS. 11B, 11C, and 11D. The wider shape causes the pinky and thumb to be spread apart more and the fingers to bend down more. In some embodiments, the hinged rods 1102, 1104, 1106, 1108, 1110, 1112 rotate to one of multiple other positions, where the various multiple positions cause the armrest 106 to take on different shapes.

Figure 12B:
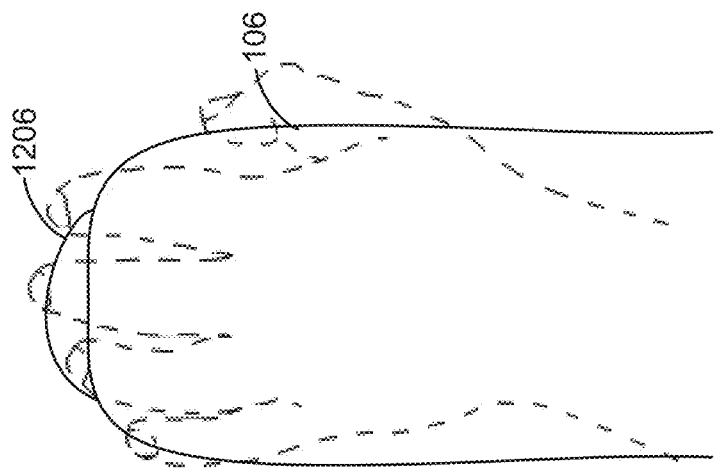
FIGS. 12A and 12B illustrate a top view of inflatable bladders that may be implemented with the armrest of FIG. 1, according to various embodiments.
Figure 12A:
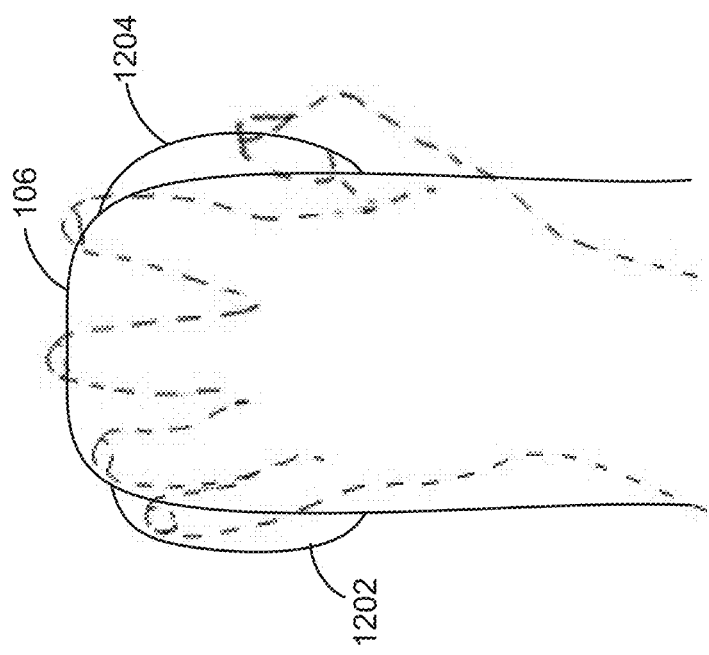

FIGS. 12A and 12B illustrate a top view of inflatable bladders 1202, 1204, 1206 that may be implemented with the armrest 106 of FIG. 1, according to various embodiments. A left bladder 1202, right bladder 1204, and top bladder 1206 may be configured to receive output signals generated via the shape manager 214 in order to cause the left bladder 1202 and/or the right bladder 1204 and/or the top bladder to inflate or deflate by a certain amount, such as by a certain volume corresponding to a certain amount of pressure change. The inflation and/or deflation of the left bladder 1202, the right bladder 1204, and the top bladder 1206 may be implemented through an air/gas pump, a liquid pump (e.g., water, oil), or another device for increasing and decreasing pressure.

As shown in FIG. 12A, inflation of the left bladder 1202 and the right bladder 1204 cause the armrest 106 to take on a rounder and wider shape. As shown in FIG. 12B, deflation of the left bladder 1202 and the right bladder 1204 and inflation of the top bladder 1206 cause the armrest 106 to take on a longer and narrower shape. The narrower shape causes the pinky and thumb to be closer together and the fingers to be pushed up and forward, away from the driver. In some embodiments, the bladders 1202, 1204, and 1206 may inflate/deflate to one of multiple different volumes, where the various multiple volumes cause the armrest 106 to take on different shapes. In various embodiments, one bladder, two bladders, or any other number of bladders may be used in conjunction with the armrest 106 to cause the armrest 106 to take on different shapes. The bladders may be composed of soft composite material or any suitable material for pneumatic actuation.

In some embodiments, certain shape change materials may be used to allow the shape manager 214 to adjust the shape of the armrest 106 or the knob 108 by generating one or more signals. For example, and without limitation, shape memory alloys, shape memory polymers, and thermoplastics may change shape when exposed to temperature changes caused by the shape manager 214. In other embodiments, dielectric electroactive polymers or other materials may change shape when the shape manager 214 causes an electric current to be applied the material(s). The above shape change materials may deform in specific ways when exposed to temperature changes or electric current. In some embodiments, when the shape manager 214 causes a temperature change and/or removes the electric current, the shape change materials may return to their original shape. In some embodiments, portions of the armrest 106 or the knob 108 include the shape change materials so that the shape manager 214 may cause those portions to change shape as described above. In yet other embodiments, the shape manager 214 may cause the shape of the armrest 106 or the knob 108 to change shape via electromagnetic elements. As different electromagnetic elements are turned on, attraction and repulsion forces may cause the armrest 106 or the knob 108 to change shape.

Figure 13A:
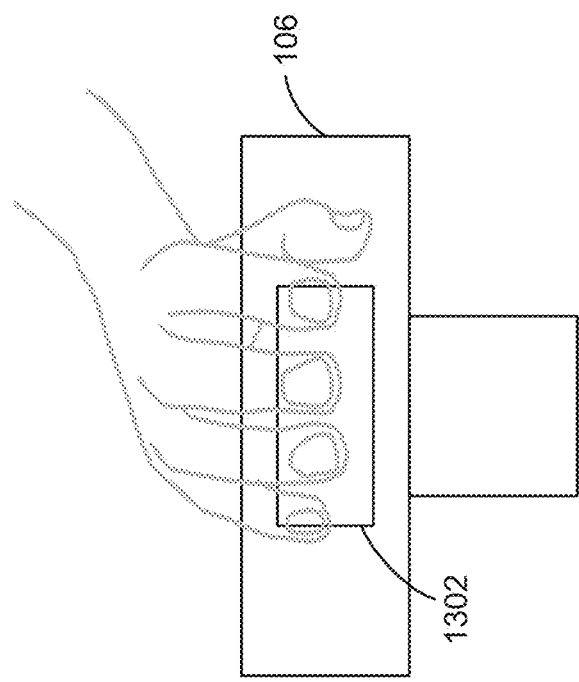
FIGS. 13A and 13B illustrate a cross section of the armrest of FIG. 1 that changes shape in a lateral direction, according to various embodiments.
Figure 13B:
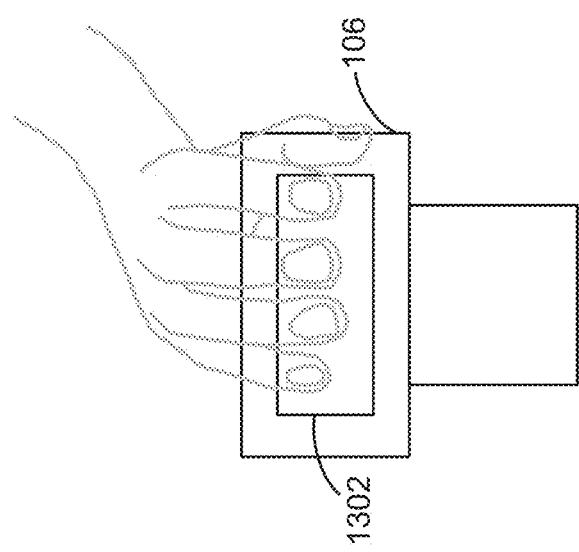

FIGS. 13A and 13B illustrate a cross section of the armrest 106 of FIG. 1 that changes shape in a lateral direction, according to various embodiments. A shape-changing device 1302 may include any of the devices described herein and/or any other suitable device for changing the shape of the armrest 106.

As shown in FIG. 13A, the shape-changing device 1302 may cause the armrest 106 to take on a narrower shape. The shape-changing device 1302 may receive a signal generated via the shape manager 214, causing at least a portion of the armrest 106 to expand horizontally as shown in FIG. 13B. The lateral expansion of the armrest 106 may cause the pinky and thumb to be spread apart more. The lateral expansion of the armrest 106 may be perceived by the driver in other ways, such as by perceiving a lateral motion of the arm or one or more other body parts. For example, and without limitation, the driver may perceive a lateral force on the side of the driver's body. In some embodiments, the shape-changing device 1302 may cause the armrest 106 to take on one of multiple shapes in between the narrower shape of FIG. 13A and the wider shape of FIG. 13B.

Figure 14B:
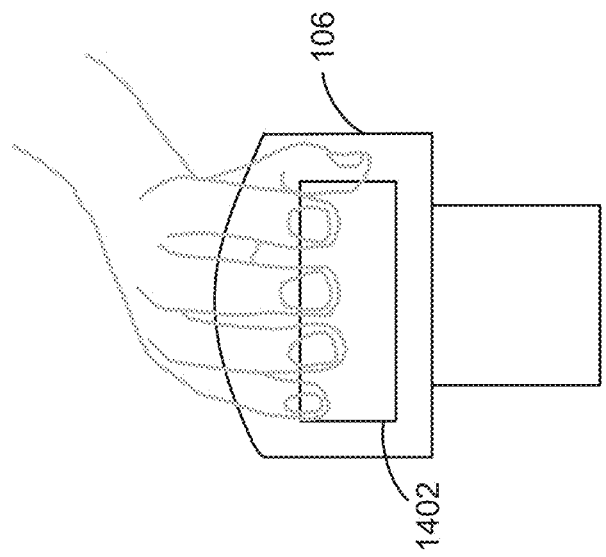
FIGS. 14A and 14B illustrate a cross section of the armrest of FIG. 1 that changes shape in a vertical direction, according to various embodiments.
Figure 14A:
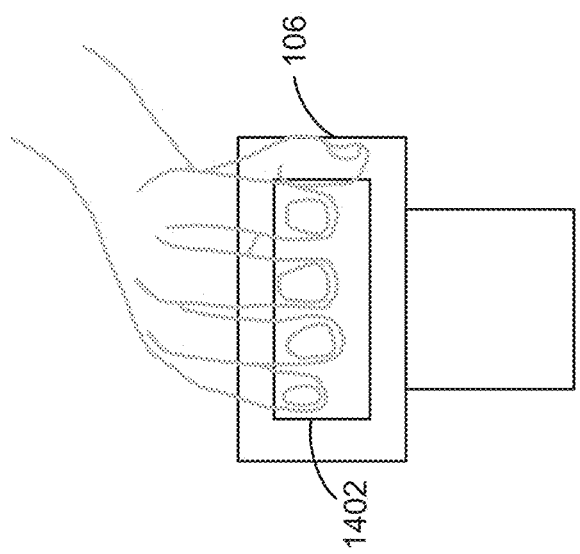

FIGS. 14A and 14B illustrate a cross section of the armrest 106 of FIG. 1 that changes shape in a vertical direction, according to various embodiments. A shape-changing device 1402 may include any of the devices described herein or any other suitable device for changing the shape of the armrest 106.

As shown in FIG. 14A, the shape-changing device 1402 causes the armrest 106 to take on a shorter shape. The shape-changing device 1402 may receive a signal generated via the shape manager 214 causing at least a portion of the armrest 106 to expand vertically as shown in FIG. 14B. The vertical expansion causes the hand and/or palm to be pushed upward. In some embodiments, the shape-changing device 1402 may cause the armrest 106 to take on one of multiple shapes in between the shorter shape of FIG. 14A and the taller shape of FIG. 14B.

Figure 15A:
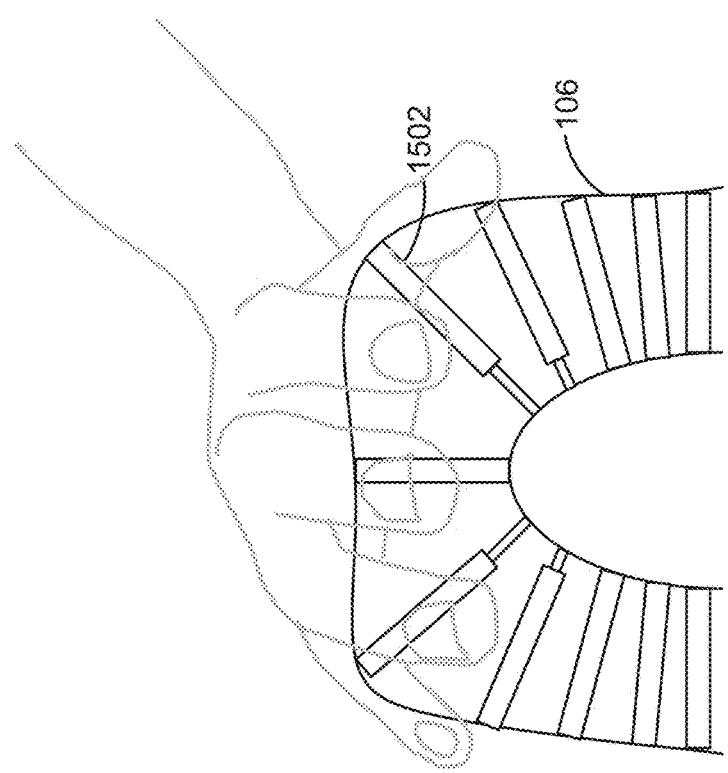
FIGS. 15A and 15B illustrate a cross section of the armrest of FIG. 1 that changes shape is multiple directions via movable elements, according to various embodiments.
Figure 15B:
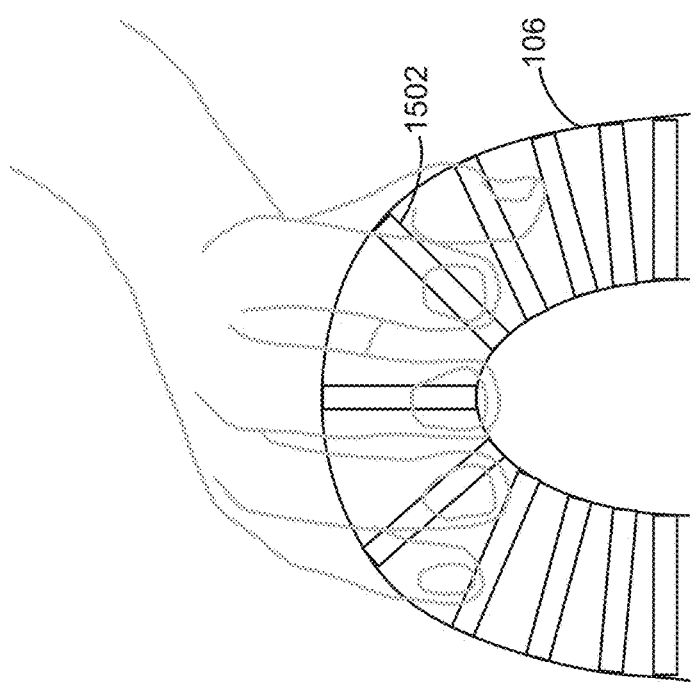

FIGS. 15A and 15B illustrate a cross section of the armrest 106 of FIG. 1 that changes shape is multiple directions via movable elements, according to various embodiments. Actuators, such as a solenoid 1502 within the armrest 106, may cause the armrest 106 to change shape. In various embodiments, any other actuator or device described herein for changing the shape of the armrest may be used, as well as any other device suitable for changing the shape of the armrest 106. The solenoid 1502 is configured to receive output signals generated via the shape manager 214 in order to cause the armrest 106 to change shape by expanding or contracting.

As shown in FIG. 15A, the solenoid 1502 causes the armrest 106 to take on a shorter or more compact shape, with an outwards curved upper surface. The solenoid 1502 may receive a signal generated via the shape manager 214 causing at least a portion of the armrest 106 to expand vertically and/or horizontally by a certain distance as shown in FIG. 15B, resulting in a flat or inwards curved top surface.

In the example embodiment, the pinky and thumb are spread apart and are in a more horizontal line in FIG. 15B than in FIG. 15A. In some embodiments, the solenoids 1502 may cause the armrest 106 to take on one of multiple shapes, depending on the change in length of the multiple solenoids 1502.

In various embodiments, such as those described in FIGS. 6A-15B, the shape of the armrest 106 may provide an indication to the user of what type of input can be provided for selecting parameters and/or viewing information associated with a particular mode of the vehicle control system 102. For example, and without limitation, when the vehicle control system 102 is in a music mode, the shape manager 214 may cause the armrest 106 to take on a round shape to indicate that different songs may be scrolled through and/or selected via rotary touch input (e.g., by moving finger(s) in a circular clockwise or counter-clockwise direction). In addition, the shape manager 214 may cause the armrest 106 to take on a long and narrow shape to indicate that different songs may be scrolled through and/or selected by moving fingers away from and towards the driver. Further, the shape manager 214 may cause the armrest 106 to take on a wide shape to indicate that different songs may be scrolled through and/or selected by moving fingers left or right relative to the user. Notably, causing a surface of the armrest 106 to take on different shapes enables a user to easily distinguish between different modes of the vehicle control system 102 without requiring the user to look away from the road.

Figure 16B:
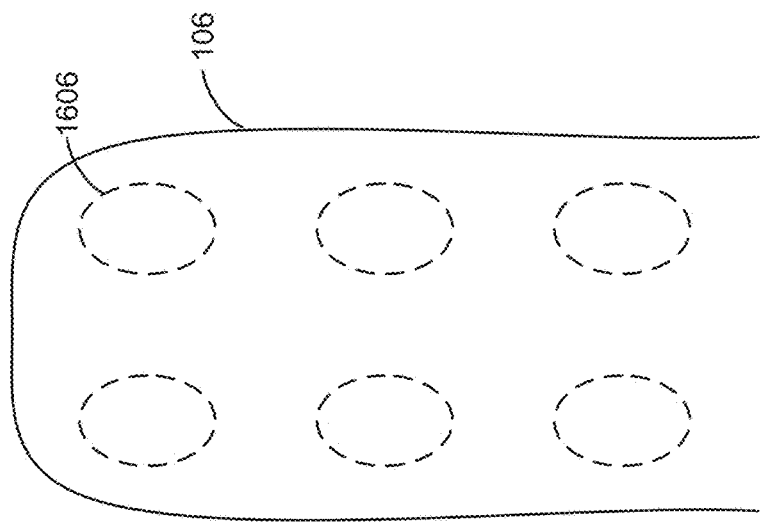
FIGS. 16A and 16B illustrate a top view of shape-changing portions of the surface that may be implemented with the armrest of FIG. 1, according to various embodiments.
Figure 16A:
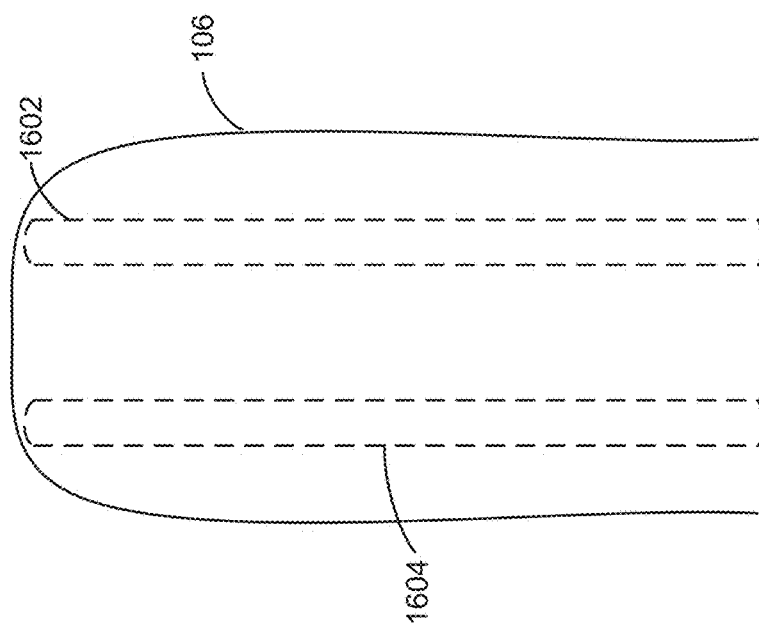

FIGS. 16A and 16B illustrate a top view of shape-changing portions of the surface that may be implemented with the armrest 106 of FIG. 1, according to various embodiments. Shape-changing devices 1602 may be any of the devices described herein for changing the shape of the armrest 106, as well as any other device suitable for changing the shape of the armrest 106.

As shown in FIG. 16A, the shape-changing devices 1602 causes the armrest 106 to expand to generate two raised ridges 1604 in a longitudinal direction with respect to the armrest 106. In some embodiments, the armrest may instead contract to form two lowered grooves. The shape-changing devices 1602 may receive one or more signals generated via the shape manager 214 causing portions of the armrest 106 to expand to create raised areas or bumps 1606 as shown in FIG. 14B. In some embodiments, the signals may instead cause portions of the armrest 106 to contract to form lowered areas or indentations. In yet other embodiments, the signals may cause some portions to expand and some portions to contract. The shape-changing devices 1602 may cause the armrest 106 to take on any number of ridges and/or grooves and any number of bumps and/or indentations. Moreover, the size and orientation of the ridges and/or grooves and the bumps and/or indentations may be varied to form multiple different shapes.

In various embodiments, portions of the armrest 106 may provide an indication to the user of what type of input can be provided for selecting parameters and/or viewing information for a particular mode. For example, and without limitation, raised ridges 1604 may indicate that different songs may be scrolled through and/or selected in a music mode by moving fingers up or down. On the other hand, bumps 1606 may indicate that particular albums or artists may be selected by pressing down on a corresponding bump 1606. Moreover, the various shapes generated via a surface of the armrest 106 enable a user to more easily distinguish between different modes of the vehicle control system 102 and/or to more easily determine suitable types of input that can be provided in a particular mode, without looking away from the road. For example, and without limitation, a user may easily distinguish between raised ridges 1604 and bumps 1606 using fingers, a thumb, hand, and/or arm.

Figure 17A:
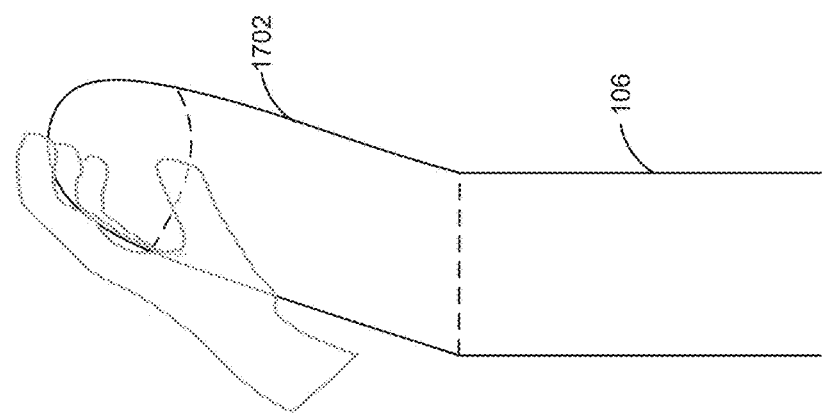
FIGS. 17A, 17B, and 17C illustrate a top view of a user modifying the position of a portion 1702 of the armrest 106 of FIG. 1, according to various embodiments.
Figure 17B:
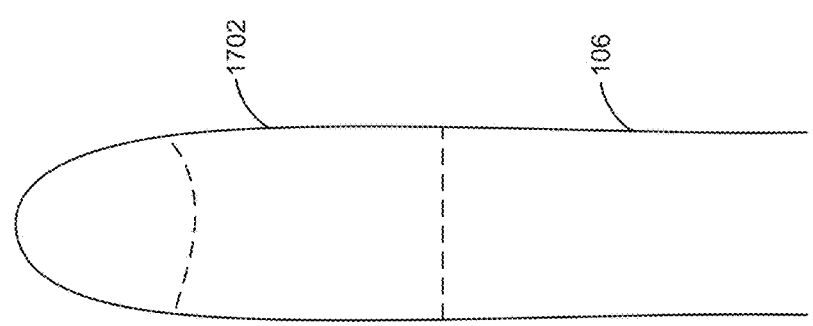
Figure 17C:
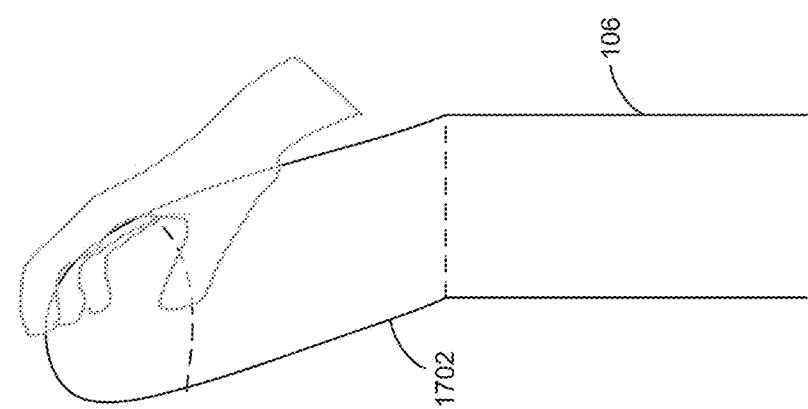

FIGS. 17A, 17B, and 17C illustrate a top view of a user modifying the position of a portion 1702 of the armrest 106 of FIG. 1, according to various embodiments. As shown, a user may move a portion 1702 of the armrest 106 to a left position with respect to the user, causing a signal to be sent to the shape manager 214. In response, the shape manger 214 then causes the mode of the vehicle control system 102 to change to a mode associated with the left position. As shown in FIG. 17B, the user may move the portion 1702 of the armrest 106 to a middle position, causing a signal to be sent to the shape manager 214. In response, the shape manger 214 then causes the mode of the vehicle control system 102 to change to a mode associated with the middle position. Further, as shown in FIG. 17C, the user may move the portion 1702 of the armrest 106 to a right position relative to the user, causing a signal to be sent to the shape manager 214. In response, the shape manger 214 then causes the mode of the vehicle control system 102 to change to a mode associated with the right position. Therefore, the mode of the vehicle control system 102 can be changed via user input by changing the shape of the armrest 106 (using a hand, fingers, arm, and/or other body parts). FIGS. 18A-20C below show additional techniques for changing the mode of the vehicle control system 102 via user input.

Figure 18A:
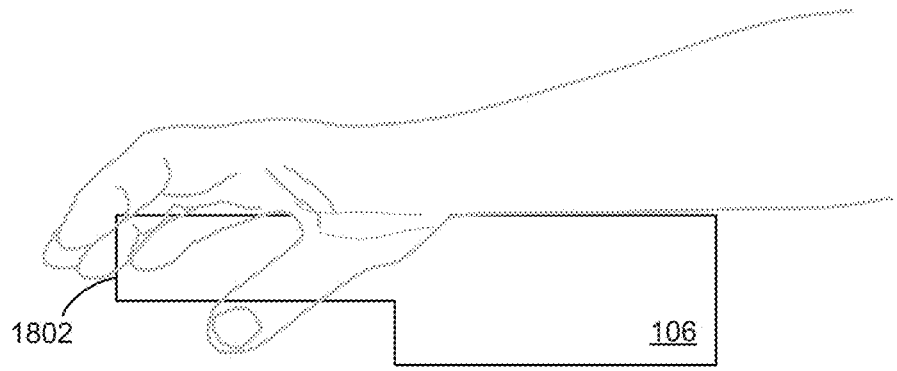
FIGS. 18A, 18B, and 18C illustrate techniques for changing the shape of a surface of the armrest of FIG. 1 in a vertical direction via user input, according to various embodiments.
Figure 18B:
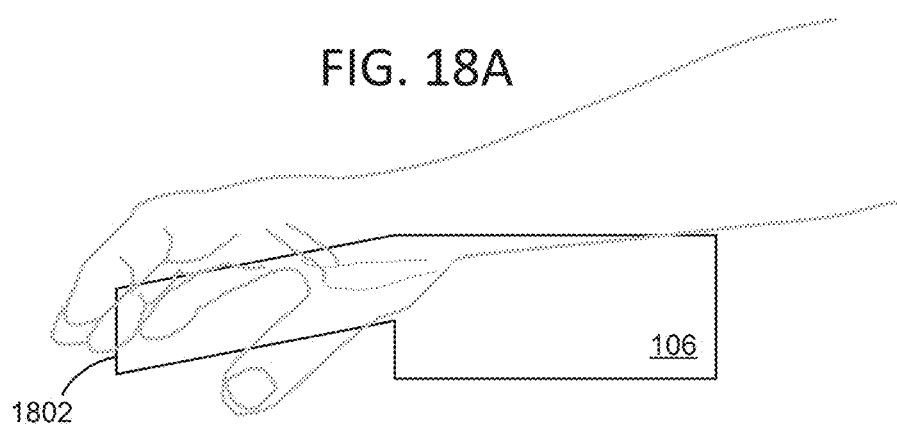
Figure 18C:
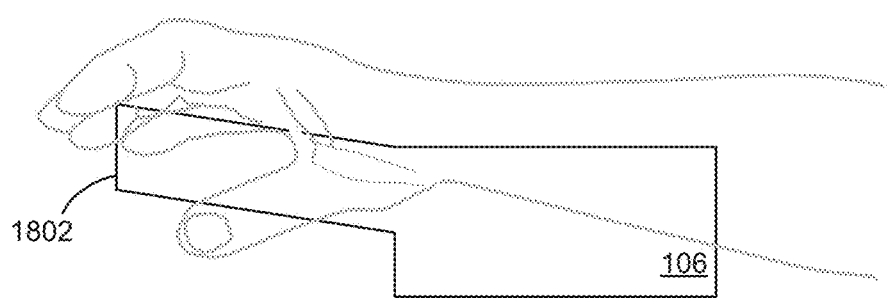

FIGS. 18A, 18B, and 18C illustrate techniques for changing the shape of a surface of the armrest 106 of FIG. 1 in a vertical direction via user input, according to various embodiments. Similar to FIGS. 17A, 17B, and 17C, a user may move a portion 1802 of the armrest 106 to a middle position shown in FIG. 18A, a lower position shown in FIG. 18B, or an upper position shown in FIG. 18C. In response, the shape manager 214 causes the mode of the vehicle control system 102 to change to a mode associated with the position of the portion 1802. In FIG. 18B, the user has pushed down on the portion 1802 of the armrest 106, causing the fingers, hand, and arm to bend slightly downward. In FIG. 18C, the user has pulled up on the portion 1802 of the armrest 106, causing the fingers, hand, and arm to bend slightly upward.

In various embodiments, such as those described for FIGS. 17A-17C and 18A-18C, any number of modes of the vehicle control system 102 may be selected by moving a portion of the armrest 106 by different predetermined distances up or down and/or left or right with respect to the user that each correspond to a different mode. For example, and without limitation, a music playback mode may be selected by moving a portion of the armrest 106 to the left. In some embodiments, parameters may then be changed in the music playback mode by moving a portion of the armrest 106 up or down. For example, and without limitation, a next song may be selected by moving a portion of the armrest 106 up. In another example, and without limitation, a cruise control mode may be selected by moving a portion of the armrest 106 to the middle. In some embodiments, parameters may then be changed in the cruise control mode by moving a portion of the armrest 106 up or down. For example, and without limitation, a cruising speed may be increased by moving a portion of the armrest 106 up. Moreover, in some embodiments, the shape manager 214 may cause a shape-changing device as described above to move a portion of the armrest 106 to different positions that each correspond to a different mode of the vehicle control system 102. Thus, the shape manager 214 can communicate the current mode by changing the position of a portion of the armrest 106.

Figure 19A:
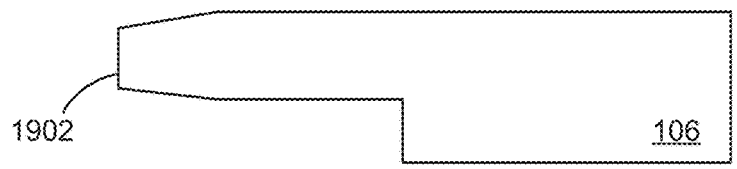
FIGS. 19A, 19B, 19C, and 19D illustrate techniques for changing the shape of a surface of the armrest of FIG. 1 in one or more directions via user input, according to various embodiments.
Figure 19B:
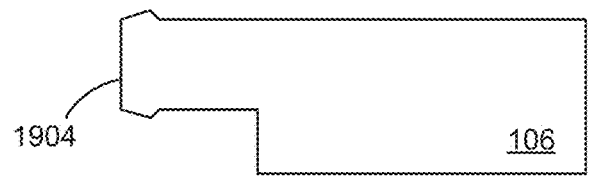
Figure 19C:
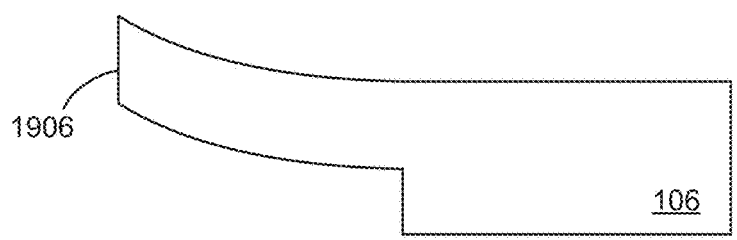
Figure 19D:
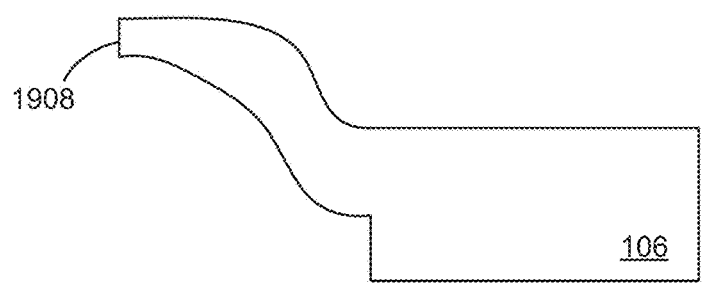

FIGS. 19A, 19B, 19C, and 19D illustrate techniques for changing the shape of a surface of the armrest of FIG. 1 in one or more directions via user input, according to various embodiments. As shown in FIG. 19A, a user may move a portion 1902 of the armrest 106 by elongating the portion 1902 away from the user or towards the front of the vehicle to create the elongated shape of FIG. 19A. Elongation of the portion 1902 causes the shape manager 214 to change the mode of the vehicle control system 102 to a mode corresponding to the elongated shape of FIG. 19A. Further, as shown in FIG. 19B, the user may move the portion 1904 of the armrest 106 by compressing the portion 1904 toward the user or toward the back of the vehicle to create the compressed shape of FIG. 19B. Compression of the portion 1904 causes the shape manager 214 to change the mode of the vehicle control system 102 to a mode corresponding to the compressed shape of FIG. 19B. Additionally, as shown in FIG. 19C, the user may move the portion 1906 of the armrest 106 by bending the portion 1906 up create the bent shape of FIG. 19C. Bending the portion 1906 causes the shape manager 214 to change the mode of the vehicle control system 102 to a mode corresponding to the bent shape of FIG. 19C. Further, as shown in FIG. 19D, the user may move the portion 1908 of the armrest 106 by pulling the portion 1908 up and away from the user or toward the front of the vehicle to create the curved shape of FIG. 19D. Pulling the portion 1908 causes the shape manager 214 to change the mode of the vehicle control system 102 to a mode corresponding to the curved shape of FIG. 19D.

In some embodiments, the shape of the armrest 106 may be changed via one or more mechanical switches that can be pulled or pushed, closing different circuits for different shapes and causing output signals to be sent to the shape manager 214. In response, the shape manager 214 changes the mode of the vehicle control system 102 to a mode corresponding to the new shape. In some embodiments, the switches may be covered by a stretchable membrane that also may be used for capacitive touch input. In other embodiments, in response to determining a current mode of the vehicle control system 102, the shape manager 214 may cause the armrest 106 to change to a new shape via a particle jamming system, where the new shape corresponds to the current mode of the vehicle control system 102.

Figure 20A:
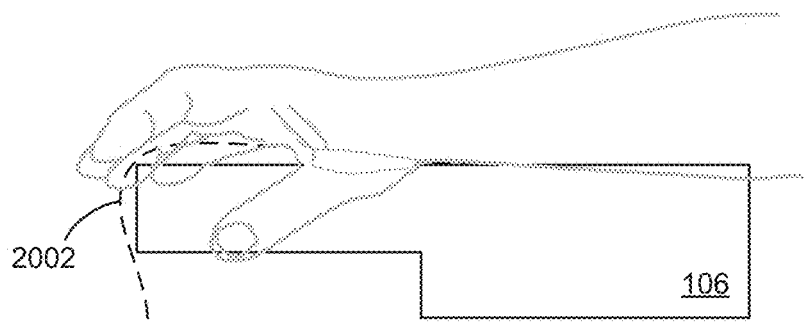
FIGS. 20A, 20B, and 20C illustrate techniques for changing the shape of a surface layer of the armrest of FIG. 1 via user input, according to various embodiments.
Figure 20B:
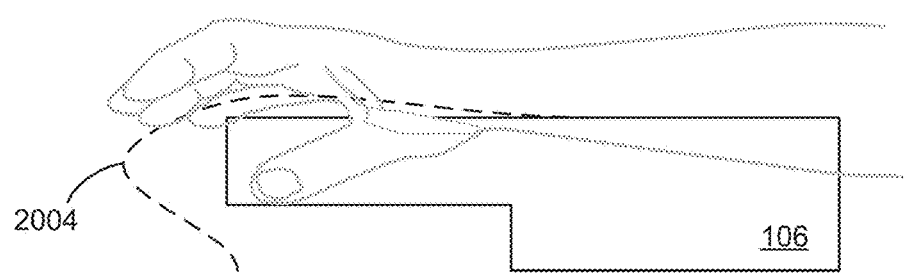
Figure 20C:
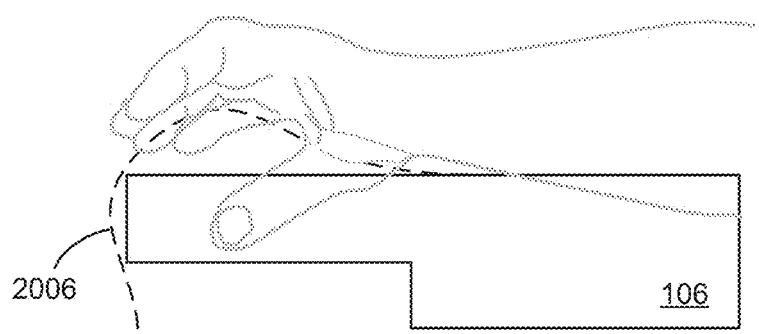

FIGS. 20A, 20B, and 20C illustrate techniques for changing the shape of a surface layer of the armrest 106 of FIG. 1 via user input, according to various embodiments. In some embodiments, the shape of the armrest in FIG. 20A is a default shape of the armrest 106.

As shown in FIG. 20A, a surface layer 2002 makes up at least a portion of the surface of the armrest 106. The surface layer 2002 may be comprised of rubber or any other material suitable for being extruded, pushed in, and shaped. As shown in FIG. 20B, a user moves a portion 2004 of the armrest 106 by extruding the portion 2004 away from the user or toward the front of the vehicle, causing an output signal to be sent to the shape manager 214. The shape manager then changes the mode of the vehicle control system 102 to a mode associated with the extruded shape of FIG. 20B. Further, as shown in FIG. 20C, the user moves a portion 2006 of the armrest 106 by extruding the portion 2006 upward, causing an output signal to be sent to the shape manager 214. The shape manager then changes the mode of the vehicle control system 102 to a mode associated with the extruded shape of 20C.

In various embodiments, such as those described for FIGS. 19A-20C, any number of modes of the vehicle control system 102 may be selected by changing the shape of the armrest 106, which may include changing the shape of the surface layer 2002. For example, and without limitation, a music playback mode may be selected by pulling or extruding a portion of the armrest 106 away from the user or toward the front of the vehicle. In some embodiments, parameters may then be changed in the music playback mode by pulling or extruding a portion of the armrest 106 up or down. For example, and without limitation, a next song may be selected by pulling or extruding a portion of the armrest 106 up.

In some embodiments, a particle jamming system may be used in conjunction with the surface layer 2002 to allow for surface extrusion and manipulation. For example, and without limitation, the shape manager 214 may receive signals from one or more different particle jammers associated with different portions of the armrest 106. In response, the shape manger 214 may change the mode of the vehicle control system 102 to a mode associated with a shape of the armrest 106 caused by the particle jammers. Furthermore, the different particle jammers may cause one or more portions of the armrest 106 to be malleable and/or one or more other portions of the armrest to be stiff.

In various embodiments, any number of modes of the vehicle control system 102 may be selected by extruding or otherwise shaping a portion of the armrest 106 in one or more directions to create different shapes that each correspond to a different mode. Moreover, in some embodiments, the shape manager 214 may cause a shape-changing device to move one or more portions of the armrest 106 to create different shapes that each correspond to a different mode of the vehicle control system 102. Thus, in some embodiments, the vehicle control system 102 can communicate the current mode by changing the shape of one or more portions of the armrest 106. In some embodiments, the entire armrest may change shape instead of just a portion.

In other embodiments, the shape of the armrest 106 may change over time and in a cyclical pattern based on a shape pattern associated with the current mode of the vehicle control system 102. For example, and without limitation, the shape manager 214 may cause the armrest 106 to change shape according to a pulsing pattern, heartbeat-like pattern, or breathing-like pattern. Thus, changing shape over time by cycling through a pattern of two or more different shapes can resemble a heartbeat or breathing. When a physical parameter associated with the vehicle changes, the shape manager 214 may cause the rate of the repeating pattern to increase or decrease in proportion to the change of the physical parameter. For example, and without limitation, as the speed of the vehicle increases, the rate of the heartbeat-like pattern or breathing-like pattern may increase. In some embodiments, the shape manager 214 may cause the armrest 106 to move in a zoomorphic manner. For example, and without limitation, the armrest 106 may change shape by curling, wriggling, or making other life-like shape changes. Furthermore, the curling, wriggling, and other life-like shape changes also may change over time in a repeating pattern, as described above.

Figure 21A:
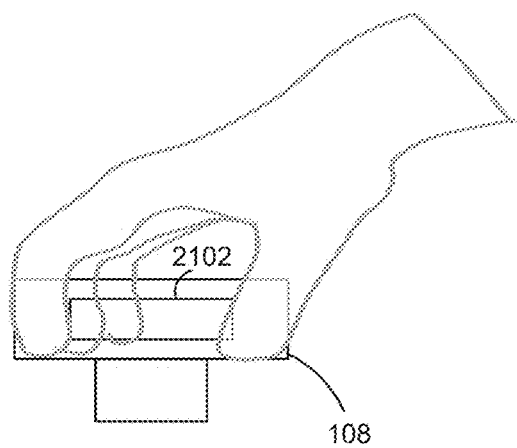
FIGS. 21A, 21B, and 21C illustrate techniques for changing the shape of a surface of the knob of FIG. 1, according to various embodiments.
Figure 21B:
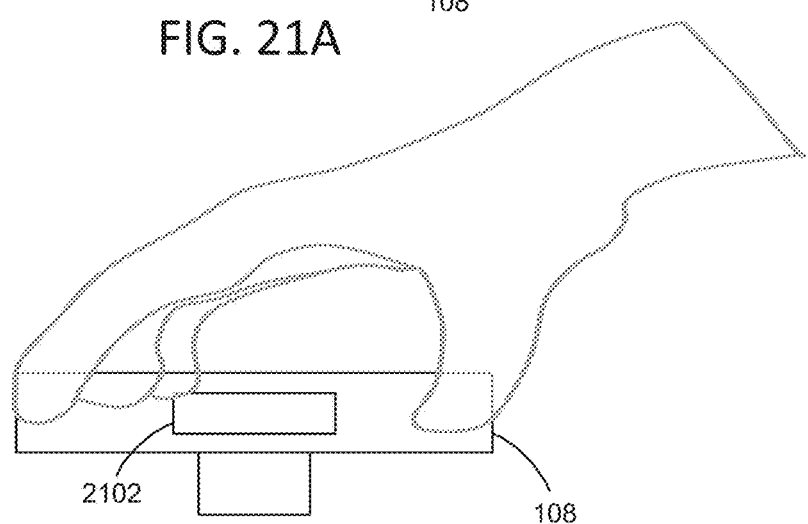
Figure 21C:
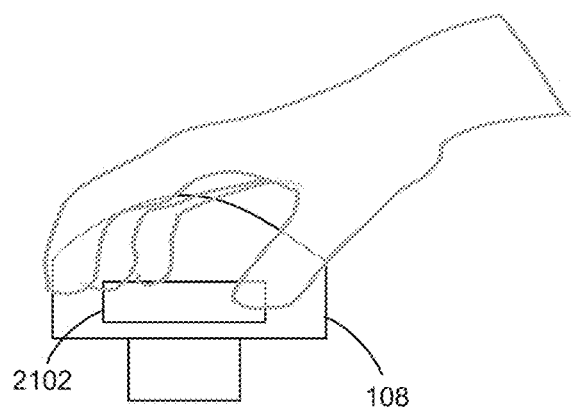

FIGS. 21A, 21B, and 21C illustrate techniques for changing the shape of a surface of the knob 108 of FIG. 1, according to various embodiments. A shape-changing device 2102 within the knob 108 may be configured to receive output signals generated via the shape manager 214. The shape-changing device 2102 may be any of the devices described herein for changing the shape of the armrest 106, or any other device suitable for changing the shape of the knob 108. Furthermore, in some embodiments, the shape-changing device 2102 includes multiple devices that cause the knob 108 to change shape via an output signal generated via the shape manager 214, such as by increasing or decreasing the diameter of the knob 108.

As shown, the shape-changing device 2102 receives a signal generated via the shape manager 214 causing at least a portion of the knob 108 to expand horizontally from the shape of the knob 108 in FIG. 21A to the shape of the knob 108 in FIG. 21B. In some embodiments, the shape manager 214 may cause the shape-changing device 2102 to take on one of multiple shapes for the knob 108 in between the narrower shape of FIG. 21A and the wider shape of FIG. 21B. Furthermore, the shape-changing device 2102 may receive a signal generated via the shape manager 214 causing at least a portion of the knob 108 to expand vertically from the shape of the knob 108 in FIG. 21A to the shape of the knob 108 in FIG. 21C.

In the example embodiment, the hand and fingers are raised more in FIG. 21C than in FIGS. 21A and 21B and the fingers are spread apart more in FIG. 21B than in FIGS. 21A and 21C. In some embodiments, the shape manager 214 may cause the shape-changing device 2102 to take on one of multiple shapes for the knob 108 in between the shorter shape of FIG. 21A and the taller shape of FIG. 21C. Moreover, the knob 108 may take on any other suitable shape in addition to those described above. For example, and without limitation, the shape manager 214 may cause the knob to take on the shape of a circle, square, triangle, star, etc.

In various embodiments, the shape of the knob 108 may provide an indication to the user of what type of input may be provided to select parameters and/or view information associated with a particular mode. For example, and without limitation, the width of the knob 108 may correspond to the rate at which a user is able to scroll through a list (e.g., a list of songs, artists, locations, etc.). In some embodiments, the wide shape of FIG. 21B may indicate that a list may be scrolled through at a slower rate than when the knob 108 has a smaller diameter, as in FIG. 21A. In other embodiments, a smaller diameter corresponds to a slower scroll rate, and a larger diameter corresponds to a higher scroll rate. In some embodiments, as shown in FIG. 21C, the height of the knob 108 is increased to indicate to the user that a song may be selected, such as by pushing down on the top of the knob 108. Moreover, the different shapes that the knob 108 can take on may allow a user to easily distinguish between different modes of the vehicle control system 102 without looking away from the road.

In some embodiments, the perceived tactile sensation of the armrest 106 or the knob 108 may also change based on the mode of the vehicle control system 102. For example, and without limitation, the shape manager 214 may increase or decrease a friction associated with touch, depending on the current mode of the vehicle control system 102. In other embodiments, the shape manager 214 may increase or decrease a temperature of the armrest 106 or the knob 108 to correspond with the current mode. In some embodiments, a sound output associated with the vehicle control system 102 may change to correspond with the current mode. In yet other embodiments, the shape manager 214 may cause a vibration or other haptic feedback to change to correspond with the current mode.

Figure 22:
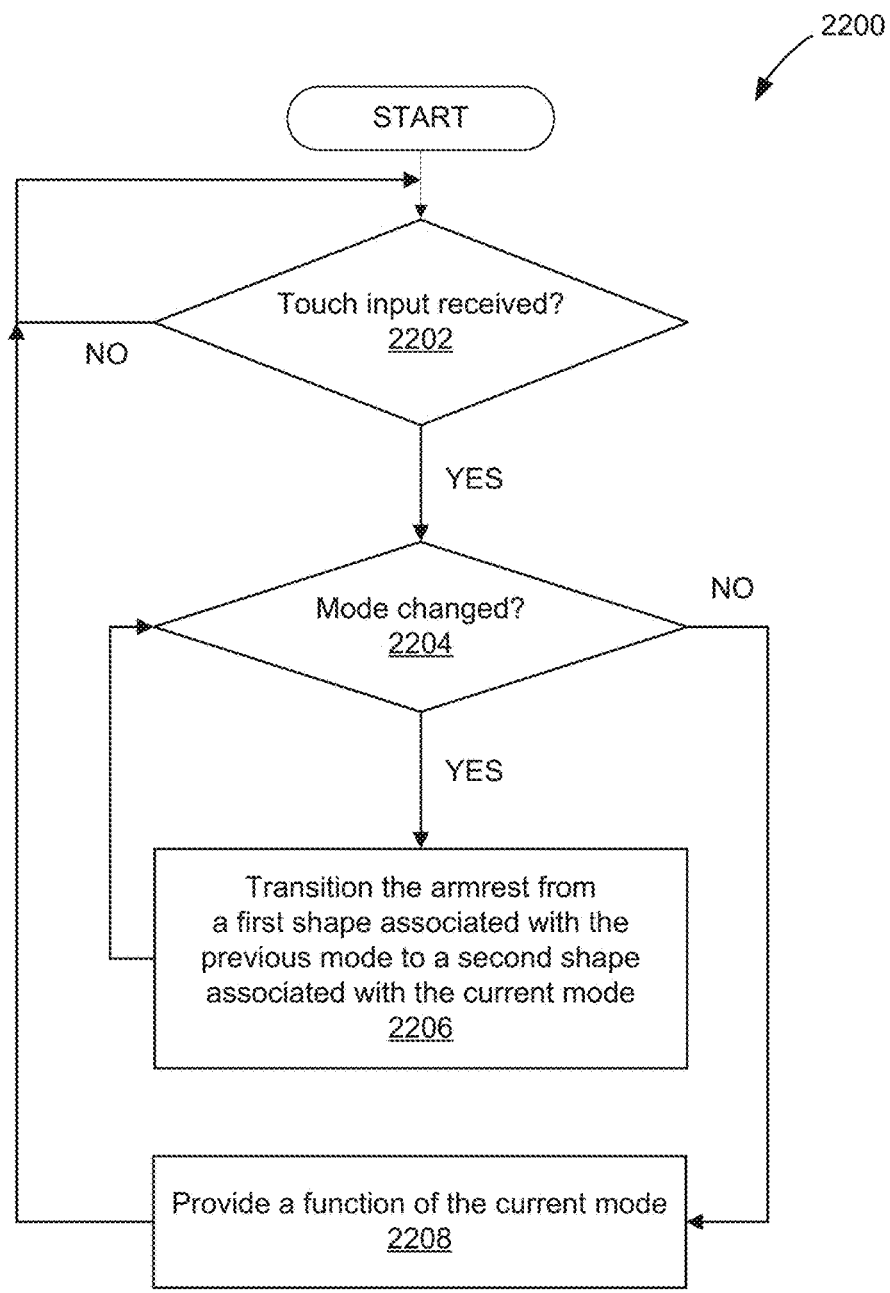
FIG. 22 is a flow diagram of method steps for changing the shape of an armrest, according to various embodiments.

FIG. 22 is a flow diagram of method steps for changing the shape of an armrest, according to various embodiments. Although the method steps are described in conjunction with the systems of FIGS. 1-21C, persons skilled in the art will understand that any system configured to perform the method steps, in any order, is within the scope of the various embodiments.

As shown, a method 2200 begins at step 2202, where the shape manager 214 determines whether touch input has been received. If the shape manager 214 determines that touch input has not been received, then the method 2200 returns to step 2202. If the shape manager 214 determines that touch input has been received, then the method 2200 proceeds to step 2204, where the shape manager 214 determines whether the mode of the vehicle control system 102 has changed from a previous mode to a current mode in response to receiving the touch input. In some embodiments, the shape manager 214 determines whether the mode of the vehicle control system 102 has changed from a previous mode to a current mode regardless of whether any touch input is received. Thus, the mode of the vehicle control system 102 may change without receiving touch input. For example, and without limitation, the mode may change in response to occurrence of an event associated with a vehicle or in response to determining that a predetermined amount of time has elapsed after the occurrence of an event associated with a vehicle.

If the shape manager 214 determines that the mode of the vehicle control system 102 changed from a previous mode to a current mode, then the method proceeds to step 2206, where the shape manager 214 causes the armrest 106 to transition from a first shape associated with the previous mode to a second shape associated with the current mode. For example, and without limitation, a signal may be generated via the shape manager 214 that causes shape-changing devices, such as actuators or rods, to move in one or more directions within the armrest 106. The method 2200 then returns to step 2202. Returning to step 2204, if the shape manager 214 determines that mode of the vehicle control system 102 has not changed, then at step 2208, the shape manager 214 provides a function associated with the current mode. The method 2200 then returns to step 2202.

Figure 23:
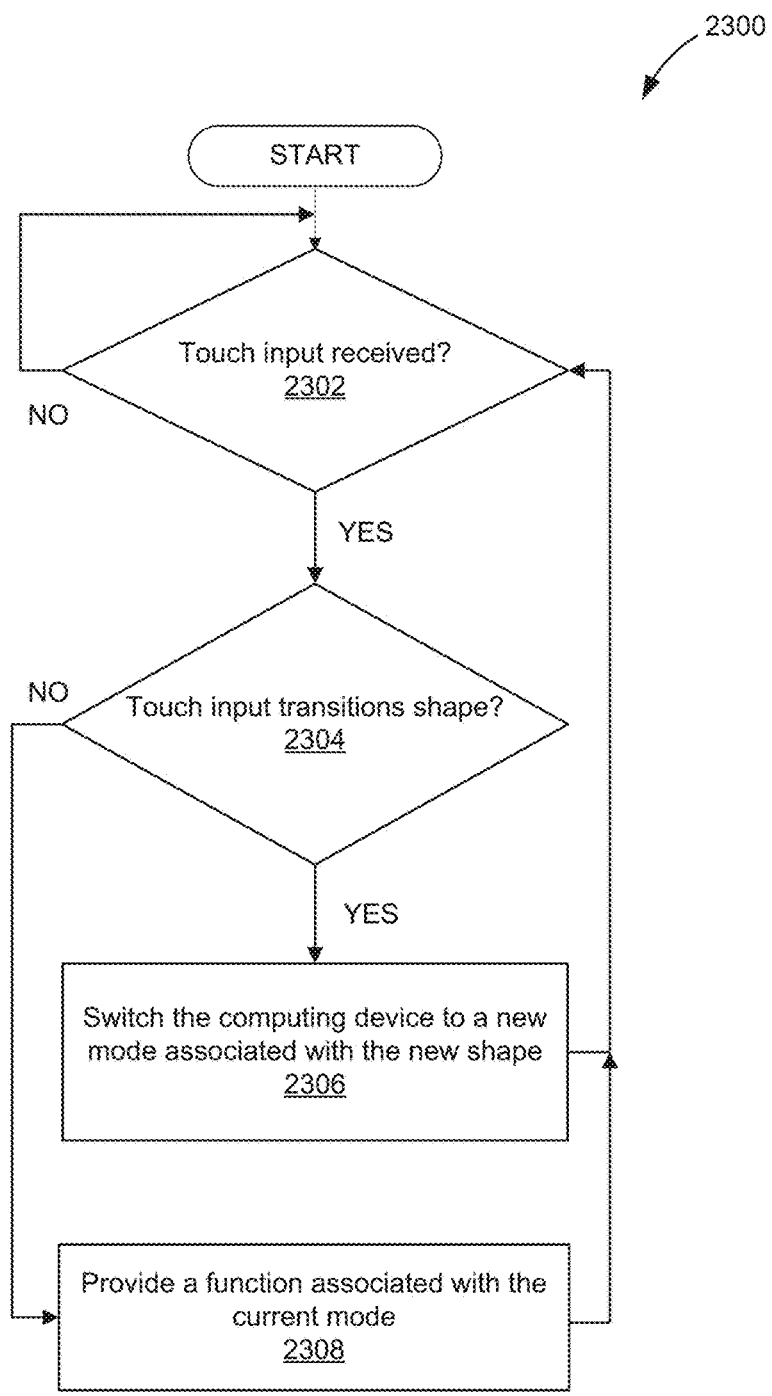
FIG. 23 is a flow diagram of method steps for changing the shape of an armrest via user input that transitions the armrest to a second shape, according to various embodiments.

FIG. 23 is a flow diagram of method steps for changing the shape of an armrest via user input that transitions the armrest to a second shape, according to various embodiments. Although the method steps are described in conjunction with the systems of FIGS. 1-21C, persons skilled in the art will understand that any system configured to perform the method steps, in any order, is within the scope of the various embodiments.

As shown, a method 2300 begins at step 2302, where the shape manager 214 determines whether touch input has been received. If the shape manager 214 determines that touch input has not been received, then the method 2300 returns to step 2302. If the shape manager 214 determines that touch input has been received, then the method 2300 proceeds to step 2304, where the shape manager 214 determines whether the touch input transitions the shape of the armrest 106 to a different shape. For example, a user may move a portion of the armrest 106 up, down, left, or right relative to the user to form the second shape. If the shape manager 214 determines that the touch input transitions the shape of the armrest 106 to a different shape, then at step 2306, the shape manager 214 switches the vehicle control system 102 to a different mode associated with the different shape. The method 2300 then returns to step 2302.

At step 2304, if the shape manager 214 determines that the touch input does not transition the armrest 106 to a different shape, then at step 2308, the shape manager 214 provides a function associated with the current mode of the vehicle control system 102. For example, the shape manager may receive touch input via the finger touch-sensitive area 402, the palm touch-sensitive area 404, or any other portion of the armrest 106 configured to produce an input signal in response to touch input. The method 2300 then returns to step 2302.

In sum, the shape manager determines that a mode of a vehicle control system has changed from a first mode to a second mode. In response, the shape manager causes a surface associated with the vehicle control system to change from a first shape associated with the first mode to a second shape associated with the second mode. The second shape may include one or more new protrusions or indentations that are associated with accepting touch input for implementing functions associated with the second mode. Additionally, the surface may be changed from the second shape to a third shape based on touch input. In response, the shape manager may then change the mode of the vehicle control system from the second mode associated with the second shape to a third mode associated with the third shape.

At least one advantage of the techniques described herein is that a user is able to operate a vehicle control system system of a vehicle without the need to look at a user interface of the vehicle control system, such as a screen. For instance, the user is able to determine a current mode of a vehicle control system by touching a shape of an armrest, knob, or other vehicle component. Based on the shape of one or more portions of the armrest, knob, or other vehicle component, the user may determine what type of input the vehicle component is configured to receive. Accordingly, the user may pay attention to driving conditions while safely and efficiently operating the vehicle control system of the vehicle.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system for changing the shape of a vehicle component, the system comprising:
one or more actuators coupled to the vehicle component;
a processor coupled to the one or more actuators, the processor configured to:
determine that a software application has switched from a first mode to a second mode; and
cause the one or more actuators to transition a surface of the vehicle component from a first shape associated with the first mode to a second shape associated with the second mode, wherein the first shape corresponds to a first direction of touch input for modifying one or more parameters in the first mode, the second shape corresponds to a second direction of touch input for modifying one or more parameters in the second mode, and the first direction is different than the second direction.

2. The system of claim 1, wherein the processor is further configured to receive, via the surface of the vehicle component, touch input, and, in response, cause the one or more actuators to transition the surface of the vehicle component from the second shape to a third shape.

3. The system of claim 1, wherein the first mode is associated with a first user interface generated via the processor, and the second mode is associated with a second user interface generated via the processor.

4. The system of claim 1, wherein the vehicle component comprises an armrest or a knob and the transitioning comprises generating a bump on the surface, wherein the bump is configured to receive input for selecting a parameter associated with the second mode.

5. The system of claim 1, wherein the one or more actuators comprise one or more inflatable bladders configured to transition the vehicle component from the first shape to the second shape, wherein the second shape is longer than the first shape.

6. The system of claim 1, wherein the one or more actuators comprise one or more hinged rods configured to transition the vehicle component from the first shape to the second shape, wherein the second shape is shorter and wider than the first shape.

7. The system of claim 1, wherein the processor is further configured to determine that the surface of the vehicle component has transitioned to a third shape, and, in response, switch the software application from the second mode to a third mode that corresponds to the third shape.

8. The system of claim 7, wherein the third mode is associated with a second software application being executed by the processor.

9. The system of claim 1, wherein causing the surface of the vehicle component to transition from the first shape to the second shape comprises causing the shape of the vehicle component to change in a repeating pattern, wherein the repeating pattern is associated with the second mode.

10. A method for changing the shape of a surface, the method comprising:
   determining that a software application has switched from a first mode associated with a first function to a second mode associated with a second function; and
   causing one or more actuators to transition the surface from a first three-dimensional shape associated with the first function to a second three-dimensional shape based on a vehicle parameter associated with the second function, wherein contours of the first three-dimensional shape correspond to a first direction of touch input for modifying one or more parameters of the first function, contours of the second three-dimensional shape correspond to a second direction of touch input for modifying one or more parameters of the second function, and the first direction is different than the second direction.

11. The method of claim 10, wherein the second three-dimensional shape is longer than the first shape, and the second function is implemented in response to touch input along a length of the second three-dimensional shape.

12. The method of claim 10, wherein the transitioning comprises generating a bump on the surface, wherein the bump is configured to receive input for selecting a parameter associated with the second function.

13. The method of claim 10, wherein the surface is coupled to one or more particle jammers configured to transition the surface from the first three-dimensional shape to the second three-dimensional shape.

14. The method of claim 10, further comprising receiving touch input via the surface and, in response, transitioning the surface from the second three-dimensional shape to a third three-dimensional shape.

15. The method of claim 10, further comprising, in response to receiving input that transitions the surface to a third three-dimensional shape, switching the software application to a third mode that corresponds to the third three-dimensional shape.

16. The method of claim 10, wherein the surface comprises a surface of a vehicle armrest.

17. The method of claim 10, wherein the surface forms a knob of a vehicle control system.

18. The method of claim 17, wherein transitioning the surface from the first three-dimensional shape to the second three-dimensional shape comprises changing a shape of the knob.

19. A non-transitory computer-readable storage medium including instructions that, when executed by a processor, cause the processor to change the shape of a surface, by performing the steps of:
   receiving input for selecting a first mode of a software application, wherein the first mode comprises a first function;
   receiving input for selecting a second mode of the software application, wherein the second mode comprises a second function; and
   causing a surface of a vehicle to transition to a first three-dimensional shape associated with the first function, wherein contours of the first three-dimensional shape correspond to a direction of touch input for modifying one or more parameters associated with the first function, contours of the second three-dimensional shape correspond to a second direction of touch input for modifying one or more parameters of the second function, and the first direction is different than the second direction.

20. The non-transitory computer-readable storage medium of claim 19, wherein the first function comprises a scrolling function, and the input comprises a scrolling gesture performed along the ridge.

* * * * *